United States Patent
Imanishi et al.

[11] Patent Number: 6,054,209
[45] Date of Patent: Apr. 25, 2000

[54] EASY TEARABLE FILMS AND METHOD OF PRODUCING THE SAME

[75] Inventors: Shinichiro Imanishi; Kenji Ueda, both of Himeji; Katsuhiko Sumida, Amagasaki, all of Japan

[73] Assignee: Daicel Chemical Industries, Ltd., Osaka, Japan

[21] Appl. No.: 09/037,174

[22] Filed: Mar. 9, 1998

Related U.S. Application Data

[62] Division of application No. 08/256,244, filed as application No. PCT/JP93/01602, Nov. 5, 1993, abandoned.

[30] Foreign Application Priority Data

Nov. 6, 1992 [JP] Japan .................................. 4-322360

[51] Int. Cl.$^7$ .......................... B32B 5/02; B32B 27/18; B32B 27/30; B32B 27/34; B32B 27/36
[52] U.S. Cl. ...................... 428/327; 428/412; 428/474.4; 428/475.5; 428/480; 428/910; 525/92 B; 525/92 E; 525/92 F; 525/95; 525/96; 525/98; 525/165; 525/176; 525/177; 525/178; 525/184; 525/420; 525/437; 525/444
[58] Field of Search ................................ 428/327, 474.4, 428/476.3, 480, 412, 910; 525/437, 445, 92 B, 92 E, 92 F, 95, 96, 98, 165, 176, 177, 178, 184, 420, 444

[56] References Cited

U.S. PATENT DOCUMENTS

| | | | |
|---|---|---|---|
| 3,234,313 | 2/1966 | Miller | 254/230 |
| 3,894,117 | 7/1975 | Agouri et al. | 260/876 B |
| 4,298,647 | 11/1981 | Cancio et al. | 428/167 |
| 4,367,312 | 1/1983 | Bontinck | 525/93 |
| 4,386,187 | 5/1983 | Grancio et al. | 525/96 |
| 4,410,482 | 10/1983 | Subramanian | 264/515 |
| 4,579,912 | 4/1986 | Canterno et al. | 525/240 |
| 5,034,449 | 7/1991 | Mallikarjun | 524/504 |
| 5,151,309 | 9/1992 | Dollinger | 428/40 |
| 5,308,668 | 5/1994 | Tsuji | 428/43 |
| 5,318,839 | 6/1994 | Arai et al. | 428/329 |

FOREIGN PATENT DOCUMENTS

| | | |
|---|---|---|
| 698750 | 11/1964 | Canada . |
| 0 148 567 A1 | 7/1985 | European Pat. Off. . |
| 0 238 756 A2 | 9/1987 | European Pat. Off. . |
| 0 337 179 A2 | 10/1989 | European Pat. Off. . |
| 63-87221 | 4/1988 | Japan . |
| 1-22537 | 1/1989 | Japan . |
| 64 56740 | 3/1989 | Japan . |
| 5-50565 | 1/1993 | Japan . |
| 6-220220 | 8/1994 | Japan . |

OTHER PUBLICATIONS

JP–A–153733, Database WPI, Week 8930, Derwent Publications Ltd., London, GB, (1989).
JP–A–04–019137, Patent Abstracts of Japan, vol. 16, No. 177, (M–1241), (1992).
JP–A–62–222831, Patent Abstracts of Japan, vol. 12, No. 81 (M–676) (1988).

Primary Examiner—Vivian Chen
Attorney, Agent, or Firm—Pillsbury Madison & Sutro LLP

[57] ABSTRACT

A tearable film comprising a resin blend which is: (1) a blend of a first polymer which is a styrenic polymer and a second polymer selected from the group consisting of a polyester and a polyamide; or (2) a first polymer which is a polyester and a second polymer selected from the group consisting of a polycarbonate, an acrylic polymer and a polyamide. The film has an continuous phase and a dispersed phase, thereby forming an islands-sea structure, wherein the continuous phase constitutes 35–98 wt % and the dispersed phase constitutes 2–65 wt % of the film.

14 Claims, 3 Drawing Sheets

EASY TEARABLE FILMS AND METHOD OF PRODUCING THE SAME

This application is a divisional of application Ser. No. 08/256,244, filed Jul. 1, 1994, abandoned, which is a 371 of PCT/JP93/01602, filed Nov. 5, 1993.

TECHNICAL FIELD

The present invention relates to an easy tearable film useful as a packaging material and to a method of producing the same.

BACKGROUND ART

As packaging materials, there are generally used biaxially-stretched films such as polypropylene film and polyethylene terephthalate film. These films, however, are poor in tear properties.

There is also known scored films to improve the tear properties of the films. Still, when a pouch is formed with a scored film, an article is affected adversely by the exterior atmosphere, or the exterior atmosphere is adversely affected by an article, in some cases, depending on the species of the content article.

On the other hand, in order to provide a readily openable packaging bag, there are also known films which are subjected to stretching in one direction to afford tear properties thereto. For example, Japanese Patent Application Laid-open Nos. 125844/1986 (61-125844), 208349/1987 (62-208349), 242746/1990 (2-242746) and 258342/1990 (2-258342) disclose a packaging material wherein a film extensively stretched in one direction is laminated on a paper or film as a base material.

Japanese Patent Application Laid-open No. 22537/1989 (64-22537) discloses a method of producing an easy tearable film which comprises mixing or blending olefinic polymers such as a low-density polyethylene or a high-density polyethylene in a predetermined proportion, extrusion-molding the mixture and stretching the resulting film in the radial direction to provide a flexible film having an islands-sea structure. This film, however, not only is poor in heat resistance and mechanical strength but also has a large tear resistance when torn by hand.

Japanese Patent Application Laid-open No. 180976/1990 (2-180976) also discloses an easy tearable film. However, a copolymer of ethylene component and a cyclic olefin of a specific structure is required to produce such a film and the film is poor in heat resistance.

Japanese Patent Publication Nos. 17632/1978 (53-17632) and 35832/1978 (53-35832) disclose a directly tearable film comprising polypropylene and an ethylene-α-olefin copolymer or others.

As thus described, when tear properties are imparted to a film by means of stretching treatment, a stretching step for stretching the film in one direction is required, thus the resultant film is high-costed and can be torn only in one direction. Further, even when the film is subjected to the stretching treatment, it is occasionally hard to tear without forming notches, and whiskers or palpi are branched from the film with tearing operation and thus the film cannot be torn sharply in one direction. Additionally, such stretching treatment may cause the formation of wrinkles or rumples by heat-sealing.

Japanese Patent Application Laid-open No. 93351/1989 (1-93351), Japanese Patent Application Laid-open No. 43047/1990 (2-43047) and Japanese Patent Application Laid-open No. 47038/1990 (2-47038) disclose a readily-cuttable polyester film having a tear propagation resistance of 300 g/mm or less in one direction. In this film, however, there is still required a copolyester having a specified structure.

Japanese Patent Application Laid-open No. 299831/1989 (1-299831) discloses a non-stretched or uniaxially-stretched film having oriented or directional tear properties which contains a polyolefin principally comprising an olefin having 4 carbon atoms or less, and polymethylpentene. Yet such an unstretched film is poor in tear properties, and stretching treatment is needed to improve the tear properties. Further, the specified polymer is still required to insure improved tear properties and, since all the above-mentioned polymers are olefinic polymers, the resulting film is still poor in, for example, heat resistance.

Japanese Patent Application Laid-open No. 19137/1992 (4-19137) discloses a method of producing an easy tearable multi-layer film which comprises extrusion-molding a resin compositions comprising two or more different and incompatible resins having largely different melting points each other to form numerous phases of the different resins in a certain direction. In this literature, there is described, as reasons of rendering the film to be multi-layer, that when a mono-layer film is composed of a resin having a higher melting point such as nylon and an olefin resin having a lower melting point in combination, the different resins are oriented in the drawing direction in a bundle form, thus the tear strength of the film is significantly sacrificed and the thus-obtained film is not practically usable. In such a film obtained by this technology, resins to be used are restricted to those having, for instance, largely different melting points from each other and a tearing direction is also limited to the predetermined direction with insufficient transparency.

Accordingly, it is an object of the present invention to provide an easy tearable film which can be torn easily at least in one direction without stretching treatment and a method of producing the same.

It is another object of the invention to provide an anisotropic easy tearable film which is tearable with an extreme ease in one direction and has a high tensile strength and tear strength in the orthogonal or transverse direction relative to the direction and a method of producing such a film.

A still another object of the present invention is to provide an easy tearable film having a practically usable strength and tearable in any direction and a method of producing the same.

A further object of the invention is to provide an easy tearable film which can be produced by use of conventional thermoplastic resins without a specialized polymer and a method of producing such a film.

It is still further object of the present invention to provide an easy tearable film being excellent not only in tear properties but also in transparency and a method of producing the same.

DISCLOSURE OF THE INVENTION

The present inventors made intensive investigations to achieve the above objects and, as a result, found that when a film has a specific fine structure, the film having excellent tear properties can be obtained by use of widely used thermoplastic resins without an extended stretching treatment. Based on these findings, the present invention has been accomplished.

Accordingly, an easy tearable film of the invention comprises a resin composition containing two or more of thermoplastic resins varying or different in repeating units as main components, wherein a dispersed phase is dispersed in a continuous phase. The dispersed phase is dispersed with, (1) the average aspect ratio of not less than 3, (2) a thickness of 1 μm or less in a layer-structure, or (3) the average aspect ratio of 3 or more and a thickness of 1 μm or less in a layer-structure.

The term "aspect ratio" of the dispersed phase refers to an aspect ratio of the dispersed phase dispersed in the continuous phase when observed from the surface side of the film. The term "thickness of the dispersed phase" means a thickness when observed from the edge side, that is, the lateral end side of the film.

The term "dispersed phase" refers not to include a dispersed phase or micro domain in a copolymer having an islands-sea structure (for example, dispersed rubber phases in an acrylonitrile-butadiene-styrene copolymer and a rubber-reinforced high impact resistant polystyrene) and a dispersed phase or micro domain due to additives such as a filler.

The terms "tearing maximum torque" and "tearing maximum normal force" respectively refer to a maximum torque and a maximum tensile force when a torsional force or torque acts on the film, and they can be determined by the under-mentioned rotary type tearing test.

In another embodiment of the present invention, the easy tearable film includes (I) a film comprising a styrenic polymer and a polyester in a specific ratio, and a film containing a high impact resistant polystyrene and a polyester in a predetermined proportion, (II) a film containing a styrenic polymer, an olefinic polymer and a compatibilizing agent such as an optionally hydrogenated copolymer of a styrenic monomer and a conjugated diene in a certain proportion, and (III) a film comprising an olefinic polymer and a polyamide in a specific proportion.

The easy tearable film mentioned above may be laminated on a readily-breakable base layer to form an easy tearable laminate or lamina.

Further, according to the method of the invention, a resin composition comprising two or more of thermoplastic resins varying or different in the repeating units as a main component is molded into a film by (4) extrusion-molding with a T-die without a stretching treatment, or (5) inflation-molding at a ratio (V/D) of a draw rate V relative to a blow rate D being equal to 0.5 to 8.

DETAILED DESCRIPTION OF THE INVENTION

Figure 1:
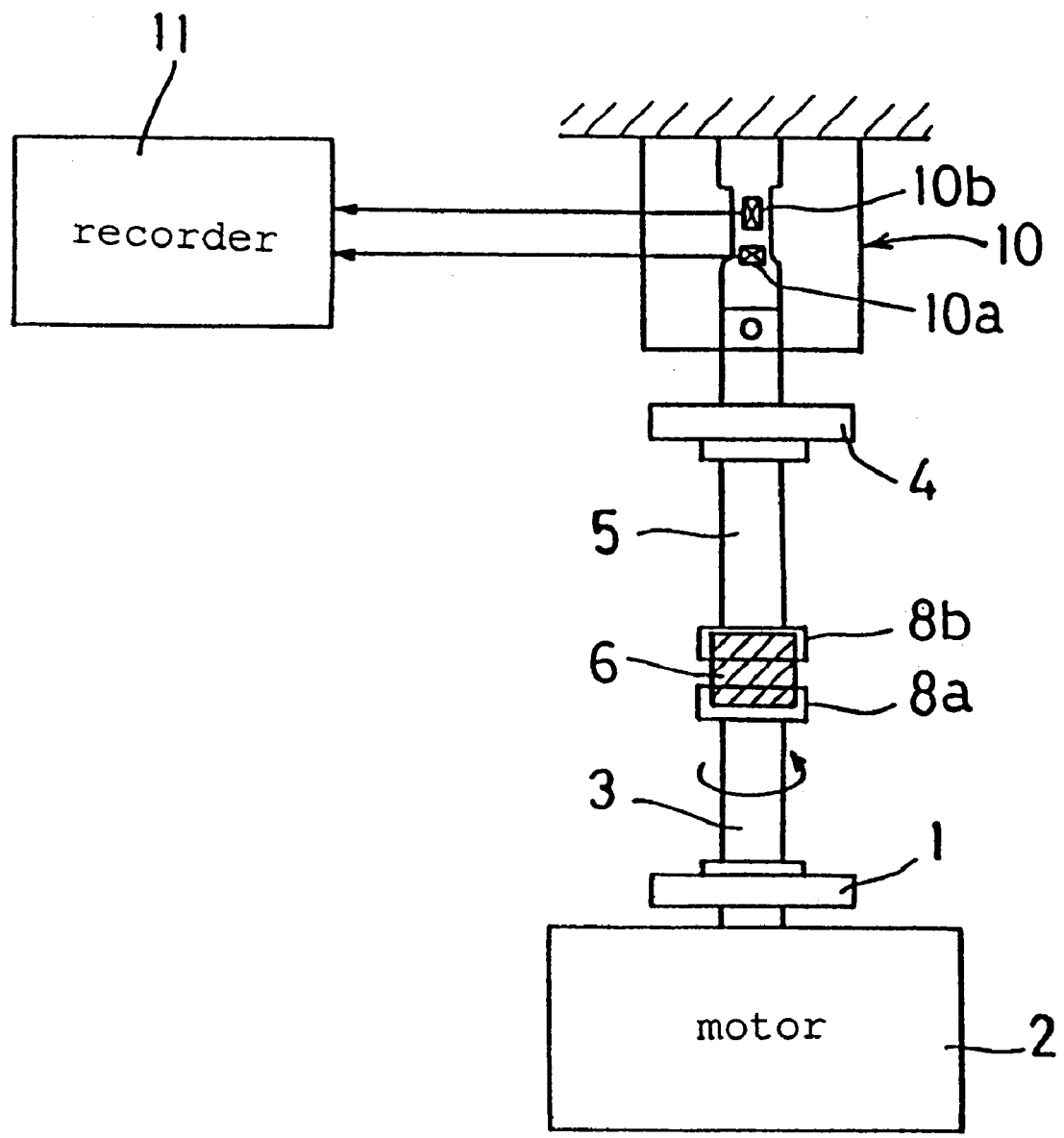
FIG. 1 is a schematic perspective view illustrating a rotary type tearing test apparatus.

The present invention will be described in more detail, if necessary with reference to the attached drawings.

The easy tearable film of the present invention has an islands-sea structure comprising a continuous phase and a dispersed phase of the film components.

The continuous phase and dispersed phase or micro domain may be formed by a film-forming procedure of a resin composition comprising, as main components, two or more thermoplastic resins different in a repeating unit.

As the thermoplastic resin, there may be mentioned, for example, following polymers (1) to (14). (1) An olefinic polymer The olefinic polymer includes a homo- or copolymer of olefins. Examples of the olefin include α-olefins such as ethylene, propylene, 1-butene, 4-methyl-1-butene, 1-pentene, 3-methyl-1-pentene, 4-methyl-1-pentene, 1-hexene, 1-octene, 1-decene, 1-dodecene, 1-tetradecene, 1-hexadecene, 1-octadecene and 1-icosene; and other olefins such as isobutene.

The olefinic polymer may be a copolymer of an olefin and a copolymerizable monomer. Typical examples of the copolymerizable monomer include ethylenically unsaturated carboxylic acids such as acrylic acid, methacrylic acid, maleic acid, fumaric acid, itaconic acid, citraconic acid, crotonic acid, isocrotonic acid, mesaconic acid and angelic acid; ethylenically unsaturated polycarboxylic acids and acid anhydrides thereof such as maleic anhydride, citraconic anhydride and itaconic anhydride; acrylic acid esters and methacrylic acid esters; ethylenically unsaturated carboxylic acid esters such as vinyl esters of carboxylic acids (e.g. vinyl acetate, vinyl propionate, etc.); cyclic olefins such as norbornene, ethylidenenorbornene and cyclopentadiene; and dienes. These copolymerizable monomers may be employed singly or in combination.

The diene component is exemplified as a straight chain conjugated diene such as 1,3-butadiene and isoprene; a straight chain non-conjugated diene such as 1,4-hexadiene, 1,6-octadiene, 2-methyl-1,5-hexadiene, 6-methyl-1,5-heptadiene and 7-methyl-1,6-octadiene; a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; a cyclic conjugated diene such as 2,3-diisopropylidene-5-norbornene, 2-ethylidene-3-isopropylidene-5-norbornene and 2-propenyl-2, 2-norbornadiene.

Preferred examples of the polymers include olefinic polymers as follows:

(1a) polyethylene, polypropylene, an ethylene-propylene copolymer, a copolymer of ethylene and/or propylene with other monomer (for example, an ethylene-vinyl acetate copolymer, an ethylene-ethyl acrylate copolymer, an ethylene-(meth)acrylic acid copolymer, a propylene-(meth)acrylic acid copolymer and so on), (1b) a noncrystalline or lower crystalline soft copolymer comprising at least two members of α-olefins (e.g. a copolymer of ethylene and an α-olefin having 3 to 20 carbon atoms, a copolymer of propylene and an α-olefin having 4 to 20 carbon atoms, etc.), (1c) an α-olefin-diene copolymer as a soft polymer (for example, a copolymer, as a rubber, of ethylene, α-olefin of 3 to 20 carbon atoms and diene, a copolymer, as a rubber, of propylene, α-olefin of 4 to 20 carbon atoms and diene, and the like), (1d) a rubber-like soft polymer (for example, a polyisobutylene rubber, a polyisoprene rubber, a polybutadiene rubber, an isoprene-isobutylene copolymer rubber, etc.), and (1e) a soft polymer having a cyclic olefin unit (e.g. a copolymer of a cyclic olefin or a cyclic diene and an α-olefin, etc.).

More preferred olefinic polymer include a polyethylene such as a low-density polyethylene, a medium-density polyethylene, a high-density polyethylene and a linear low-density polyethylene; an ethylene-vinyl acetate copolymer;

an ethylene-ethyl acrylate copolymer; an ethylene-(meth) acrylic acid copolymer; polypropylene; a propylene-(meth) acrylic acid copolymer; a modified polyolefin such as an epoxy-modified polyolefin (e.g. an ethylene-glycidyl (meth) acrylate copolymer), a carboxyl-modified polyolefin (for example, an ethylene-maleic anhydride copolymer) and an epoxy- and carboxyl-modified polyolefin (e.g. an ethylene-(meth)acrylic acid-maleic anhydride copolymer); an ethylene-propylene copolymer; an olefinic elastomer; and an ethylene propylene rubber.

Among the polymers belonging to the category (1a), specifically preferred olefinic polymer includes a homo- or copolymer comprising ethylene or propylene as a main component. As such olefinic polymer, there may be mentioned, for example, polyethylene, polypropylene, an ethylene-propylene copolymer, a copolymer of ethylene and/or propylene with a straight chain or branched α-olefin having 1 to 6 carbon atoms. The content of ethylene and/or propylene in the olefinic copolymer is 65% by weight or more. Thus, polyethylene, polypropylene and an ethylene-propylene copolymer are practically preferred among others.

The copolymer may frequently be a random copolymer. The homopolymers and/or copolymers mentioned above can also be used in combination.

(2) A halogen-containing vinyl polymer

As the halogen-containing vinyl polymer, there may be mentioned, for example, a homopolymer of a halogen-containing monomer such as polyvinyl chloride, polyvinylidene chloride, polyvinyl fluoride (e.g. polytetrafluoroethylene, polyperfluoropropylene, etc.) and polychloroprene; a copolymer of a halogen-containing monomer with other monomer such as a vinyl chloride-vinyl acetate copolymer, a vinylidene chloride-vinyl acetate copolymer, a vinylidene chloride-acrylonitrile copolymer, a vinylidene chloride-(meth)acrylic acid copolymer and vinylidene chloride-(meth)acrylic acid ester copolymer; and a halogenated polymer such as a chlorinated polypropylene and a chlorinated rubber.

(3) An acrylic polymer

The acrylic polymer includes, for example, a homopolymer or copolymer of an acrylic monomer such as acrylic acid, methacrylic acid, an acrylic acid ester, a methacrylic acid ester, acrylamide and acrylonitrile; and a copolymer of an acrylic monomer and other monomer.

As examples of the acrylic homopolymer or copolymer, there may be mentioned polyacrylate, polymethacrylate, an acrylic acid ester-methacrylic acid ester copolymer, polyacrylamide, polyacrylonitrile and others. The copolymer of an acrylic monomer includes a (meth)acrylic acid ester-styrene copolymer, a (meth)acrylic acid-styrene copolymer, an acrylonitrile-butadiene-styrene copolymer, an acrylonitrile-styrene copolymer, an acrylonitrile-styrene-(meth)acrylic acid ester copolymer and so on. These acrylic polymers can be employed independently or in combination.

Preferred examples of the acrylic polymer include poly (methyl methacrylate), a (meth)acrylic acid-styrene copolymer and a (meth)acrylic acid ester-styrene copolymer.

(4) A vinyl polymer

The vinyl polymer includes a homopolymer or copolymer of a vinyl monomer and a polymer derived from such polymers. The vinyl monomer includes, for instance, a vinyl ester such as vinyl acetate, vinyl propionate, vinyl crotonate, vinyl laurate, vinyl oleate, vinyl stearate, vinyl maleate and vinyl benzoate; a vinyl ketone such as methyl vinyl ketone and methyl isopropenyl ketone; a vinyl ether such as vinyl methyl ether, vinyl ethyl ether and vinyl isobutyl ether; a vinylamine such as N-vinylcarbazole and N-vinylpyrrolidone; and the like. The vinyl monomer may be compolymerized with other copolymerizable monomer to form a copolymer (for example, an ethylene-vinyl acetate copolymer and others).

The polymer derived from the vinyl homopolymer may be exemplified as polyvinyl alcohol and polyvinyl acetal such as polyvinyl formal and polyvinyl butyral. As example of the polymer derived from the vinyl copolymer, there may be mentioned an ethylene-vinyl alcohol copolymer from an ethylene-vinyl acetate copolymer.

Among these vinyl copolymers, a polyvinyl ester (e.g. polyvinyl acetate), a polyvinyl ketone, a polyvinyl ether, a polyvinyl alcohol, a polyvinyl acetal, an ethylene-vinyl acetate copolymer and an ethylene-vinyl alcohol copolymer are practically preferred.

(5) An aromatic vinyl polymer

Example of the aromatic vinyl polymer includes (5a) a styrenic polymer and (5b) a styrenic monomer-conjugated diene copolymer.

(5a) A styrenic polymer

Examples of the styrenic polymer include a homopolymer or copolymer of a styrenic monomer such as styrene, α-methylstyrene and chlorostyrene, a copolymer of a styrenic monomer with a vinyl monomer (e.g. a unsaturated nitrile such as acrylonitrile; an α,β-mono-olefinically unsaturated carboxylic acid, or an acid anhydride or ester thereof such as (meth)acrylic acid, a (meth)acrylic acid ester and maleic anhydride, etc.), an impact resistant polystyrene (a high impact resistant polystyrene HIPS), an impact resistant styrenic resin and others.

The impact resistant polystyrene can be prepared by blending or mixing a diene rubber elastomer with polystyrene or by graft-polymerizing a styrenic monomer to a diene rubber elastomer. The impact resistant styrenic resin is also obtainable by graft-copolymerizing a styrenic monomer with a vinyl monomer (for instance, acrylonitrile, methyl methacrylate, etc.) to a polymer such as a diene rubber elastomer including polybutadiene and others, an acrylic rubber having an unsaturated group, a chlorinated polyethylene, an ethylene-vinyl acetate copolymer and an ethylene-propylene rubber.

Preferred examples of the styrenic polymers include polystyrene (hereinafter referred to as GPPS), a styrene-(meth) acrylic acid copolymer, a styrene-(meth)acrylic acid ester copolymer such as a methyl methacrylate-styrene copolymer (hereinafter referred to as MAS resin) and others, a styrene-maleic anhydride copolymer, a styrene-acrylonitrile copolymer (hereinafter briefly referred to as AS resin), an impact resistant polystyrene and an impact resistant styrenic polymer such as ABS resin obtainable by graft-polymerizing styrene and acrylonitrile to a polybutadiene, AAS resin obtainable by graft-polymerizing styrene and acrylonitrile to an acrylic rubber, ACS resin obtainable by graft-polymerizing styrene and acrylonitrile to a chlorinated polyethylene, a grafted polymer obtainable by graft-polymerizing styrene and acrylonitrile to an ethylene-vinyl acetate copolymer, a grafted polymer obtainable by graft-polymerizing styrene and acrylonitrile to an ethylene-propylene rubber and MBS resin obtainable by graft-polymerizing styrene and methyl methacrylate to a polybutadiene, and the like. These styrenic polymers can be used singly or in combination.

Among these styrenic polymers, a styrenic polymer having a high transparency (for example, polystyrene, a styrene-(meth)acrylic acid copolymer, a styrene-(meth)acrylic acid ester copolymer including a methyl methacrylate-styrene copolymer, a styrene-acrylonitrile copolymer, etc.), an impact resistant polystyrene and an impact resistant styrenic polymer can advantageously be employed.

Hereinafter, otherwise defined, the impact resistant polystyrene and the impact resistant styrenic polymer are generically named simply to "rubber-modified impact resistant polystyrene".

With the use of the styrenic polymer having a high transparency in combination with, for example, a polyester, a film having an enhanced transparency and an excellent tear properties or tearability can be obtained. Further, when the styrenic polymer is combined with a polyester, the resulting film is excellent in tear properties not only in the film drawing direction but also in the orthogonal direction relative to the film drawing direction.

In combination with a polyester, use of the rubber-modified impact resistant polystyrene modified with an α,β-unsaturated aliphatic carboxylic acid such as (meth) acrylic acid, or an α,β-unsaturated aliphatic polycarboxylic acid, acid anhydride or ester thereof such as maleic anhydride increases the affinity with the polyester, thus the tear properties of the film may be sacrificed in some cases. Therefore, the preferred examples of the rubber-modified impact resistant polystyrene used in combination with the polyester include a copolymer of a monomer other than an α,β-unsaturated aliphatic carboxylic acid, an α,β-unsaturated aliphatic polycarboxylic acid, or an acid anhydride or ester thereof.

(5b) A styrenic monomer-conjugated diene copolymer

The copolymer include a random copolymer, a block copolymer and their hydrogenated copolymer of a styrenic monomer and a conjugated diene. The copolymer may usually composes a soft polymer.

Example of the copolymer includes a styrene-butadiene copolymer, a styrene-butadiene-styrene (SBS) block copolymer, a styrene-isoprene block copolymer, a styrene-isoprene-styrene (SIS) block copolymer, a hydrogenated styrene-butadiene-styrene (SEBS) block copolymer, a hydrogenated styrene-isoprene-styrene (SEPS) block copolymer, a styrene-butadiene random copolymer, or others.

The hydrogenated copolymer is a copolymer prepared by hydrogenating a part or whole of double bonds in the above-mentioned copolymer. Such hydrogenation may cause the formation of a cyclohexane ring from benzene ring, and the hydrogenation may frequently occur in the double bonds from the diene. The hydrogenation rate is usually 50% or more, and preferably 70% or more. Preferred example of the hydrogenated copolymer includes the SEBS block copolymer and SEPS block copolymer.

The copolymer may be modified by, for instance, maleic anhydride, (meth)acrylic acid, a (meth)acrylic acid ester, glycidyl (meth)acrylate, or others.

(6) A polycarbonate

The polycarbonate includes a polymer obtainable by allowing a dihydroxy compound to react with phosgen or a carbonic diester such as diphenyl carbonate. The hydroxyl compound may be an alicyclic compound or others but preferably be a bisphenol compound.

As examples of the bisphenol compound, there may be mentioned bis(4-hydroxyphenyl)methane, 1,1-bis(4-hydroxyphenyl)ethane, 1,1-bis(4-hydroxyphenyl)propane, hydroxyphenyl)ethane, 1,1-bis(4-hydroxyphenyl)propane, 2,2-bis(4-hydroxyphenyl)propane (hereinafter referred to as bisphenol A), 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 1,1-bis(4-hydroxyphenyl)cyclopentane, 1,1-bis(4-hydroxyphenyl) cyclohexane, bis(4-hydroxy-3-methylphenyl)methane, 1,1-bis(4-hydroxy-3-methylphenyl)ethane, 2,2-bis(4-hydroxy-3-methylphenyl)propane, 2,2-bis(4hydroxy-3-ethylphenyl) propane, 2,2-bis(4-hydroxy-3-isopropylphenyl)propane, 2,2-bis(4-hydroxy-3-sec-butylphenyl)propane, bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, bis (4-hydroxyphenyl)dibenzylmethane, 4,4',-dihydroxydiphenyl ether, 4,4'-dihydroxydiphenyl sulfone, 4,4'-dihydroxydiphenyl sulfide and so on.

Practically preferred example of the polycarbonates includes a bisphenol A type polycarbonate.

(7) A polyester

Example of the polyester includes a polyester derived from a dicarboxylic acid or a lower alkyl ester thereof and a glycol; a polyester obtainable from a hydroxycarboxylic acid, if necessary, with a dicarboxylic acid or a lower alkyl ester thereof and/or a glycol; a polyester derived from a lactone.

The dicarboxylic acid component includes, for example, aliphatic dicarboxylic acids such as glutaric acid, adipic acid, pimelic acid, suberic acid, azelaic acid and sebacic acid; alicyclic dicarboxylic acids such as cyclohexane-1,4-dicarboxylic acid; aromatic dicarboxylic acids such as terephthalic acid, isophthalic acid, phthalic acid, phthalic anhydride, p-β-ethoxybenzoic acid, 2,6-naphthalenedicarboxylic acid, di(p-carboxyphenyl)ketone, di(p-carboxyphenyl)ether, bis(4-carboxyphenyl)ethane and 5-sodiumsulfo isophthalic acid; and so on.

As examples of the glycol component, there may be mentioned an aliphatic diol such as ethylene glycol, diethylene glycol, polyethylene glycol, propylene glycol, dipropylene glycol, polypropylene glycol, butanediol, polytetramethylene glycol, hexanediol and neopentyl glycol; an alicyclic diol such as a cyclohex—anediol; an aromatic diol such as bisphenol A; and an alkylene oxide (e.g. ethylene oxide) adduct of bisphenol A.

The hydroxycarboxylic acid component includes, for example, p-oxybenzoic acid and the like.

The lactone include, for example, propiolactone, butyrolactone, valerolactone, caprolactone, laurolactone, palmitolactone and stearolactone.

The polyester also includes a polyester elastomer.

Such elastomer may comprise a polyester as main component and may have a segment such as polytetramethylene glycol and so on.

The polyester may contain a small amount of a copolymeric component unit of an amide bond, urethane bond, ether bond or carbonate bond.

Among these polyester, a polyester having terephthalic acid unit such as polyethylene terephthalate, polybutylene terephthalate and poly-1,4-dimethylolcyclohexane terephthalate can advantageously be used. These polyesters may usually be crystalline The crystalline polyesters may be modified by a dicarboxylic acid component and/or a glycol component other than the constituents.

(8) A polyamide

As the polyamide, there may be mentioned, for example, a polyamide obtainable from a diamine and a dicarboxylic acid; a polyamide derived from an amino-carboxylic acid, when necessary, with a diamine and/or a dicarboxylic acid; a polyamide from a lactam; and so on. A copolyamide can also be employed as the polyamide.

As the diamine, there may be mentioned a compound shown by the general formula $H_2N$-L-$NH_2$ wherein L represents a divalent aliphatic group, a divalent alicyclic group or a divalent aromatic group, which may have a substituent.

Typical examples of the diamine include an aliphatic diamine such as trimethylenediamine, tetramethylenediamine, pentamethylenediamine, hexamethylenediamine, 2,2,4-trimethylhexamethylenediamine, 2,4, 4-tri-methylhexamethylenediamine and octamethylenediamine; an aromatic diamine such as a phenylenediamine and a metaxylylenediamine; an alicyclic diamine such as bis(4-amino-3-methylcyclohexyl)methane. These diamines may be employed singly or in combination.

As the dicarboxylic acid, a compound shown by the general formula HOOC—M—COOH wherein M represents a divalent aliphatic group, a divalent alicyclic group or a divalent aromatic group, which may optionally be substituted, or its acid anhydride can be employed.

The dicarboxylic acid may be exemplified with an aromatic dicarboxylic acid such as phthalic acid, phthalic anhydride, isophthalic acid and terephthalic acid; an alicyclic dicarboxylic acid such as cyclohexane-1,4-dicarboxylic acid and cyclohexane-1,3-dicarboxylic acid; an aliphatic dicarboxylic acid such as glutaric acid, adipic acid, pimelic acid, suberic acid, azelaic acid, sebacic acid and octadecanedioic acid; and a dimerized fatty acid. The dimerized fatty acid may be a polymerized fatty acid prepared by polymerizing a fatty acid, for example, a naturally-occurred or synthetic basic unsaturated fatty acid having 8 to 24 carbon atoms. Such dimerized fatty acid includes, for instance, a dimer of linolenic acid.

Examples of the aminocarboxylic acid include aminoheptanoic acid, aminononanoic acid, aminoundecanoic acid, etc. These aminocarboxylic acids may also be used independently or in association.

As the lactam, there may be mentioned for example butyrolactam, pivalolactam, caprolactam, capryllactam, enanthlactom, undecanolactam and dodecalactom. These lactams may be used independently or in combination.

Typical examples of the polyamide include nylon 46, nylon 6, nylon 66, nylon 610, nylon 612, nylon 11, nylon 12, a polyamide obtainable from terephthalic acid. and/or isophthalic acid and hexamethylenediamine, a polyamide obtainable from adipic acid and meta-xylylenediamine, a polyamide obtainable from terephthalic acid, adipic acid and hexamethylenediamine, a copolyamide comprising a dimerized fatty acid as a copolymerizable component, and a copolyamide formed with at least two different components metnioned above capable of forming a polyamide. These polyamides can be employed singly or in combination. The polyamide also includes a polyamide elastomer.

As the polyamide, nylon 6, nylon 66, nylon 610, nylon 612, nylon 11, nylon 12 and so on can advantageously be utilized. Use of nylon 11 or nylon 12 as the polyamide gives, an easy tearable film having a high transparency even in combination with the olefinic polymer.

(9) A polymer from an epoxide

The polymer includes a homopolymer or a copolymer of an alkylene oxide such as ethylene oxide, propylene oxide and the like. Examples of the polymer include polyethylene oxide, polypropylene oxide, a copolymer formed with ethylene oxide and propylene oxide.

(10) A polyacetal

The polyacetal includes, for example, a homopolymer of an aldehyde such as formaldehyde and trioxan, or a copolymer of one of the monomers as a principle component. As the copolymer, there may be mentioned, for example, a copolymer formed with formaldehyde or trioxan and other monomer (e.g. one of other aldehydes including acetaldehyde, a cyclic ether including ethylene oxide and 1,3-dioxolan, cyclic carbonates, epoxides, isocyanates, vinyl compounds, etc.). The terminal of the polyacetal may be esterified with an organic acid such as acetic acid.

(11) A polyphenylene oxide

The polyphenylene oxide includes a homopolymer and a copolymer. Examples of the homopolymer include poly(2, 6-dimethyl-1,4-phenylene)oxide, poly(2-methyl-6-ethyl-1, 4-phenylene)oxide, poly(2,6-diethyl-1,4-phenylene)oxide, poly(2-methyl-6-n-propyl-1,4-phenylene)oxide, poly(2,6-di-n-propyl-1,4-phenylene)oxide, poly(2-methyl-6-n-butyl-1,4 -phenylene)oxide, poly(2-ethyl-6-isopropyl-1,4-phenylene)oxide, poly(2-methyl-6-chloro-1,4-phenylene) oxide, poly(2-methyl-6-hydroxyethyl-1,4-phenylene)oxide, poly(2-methyl-6-chloroethyl-1,4-phenylene)oxide and so on.

As the copolymer of the polyphenylene oxide, there may be mentioned a modified polyphenylene oxide copolymer, a modified graft copolymer and others. The modified polyphenylene oxide may comprise an alkylphenol-modified benzene formaldehyde resin block, prepared by allowing a benzene formaldehyde resin or an alkylbenzene formaldehyde resin to react with an alkylphenol such as cresol and p-tert-butylphenol, and polyphenylene oxide block as the main structure. The modified graft copolymer may be prepared by grafting a styrenic polymer to a polyphenylene oxide or a copolymer thereof.

(12) A polysulfone

The polysulfone may be exemplified with a thermoplastic polysulfone having a structural unit shown by the following general formula:

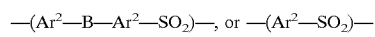

wherein $Ar^2$ represents an arylene group such as phenylene group, and B represents oxygen atom, sulfur atom or an aromatic diol residue.

Examples of the polysulfone include poly(ether sulfone), poly(4,4'-bisphenol ether sulfone) and so on.

(13) A polyurethane

Examples of the polyurethanes include a polymer obtainable by allowing a diisocyanate compound such as tolylene diisocyanate to react with the above-mentioned glycols and/or the above-mentioned diamines. Further, polyurethane elastomers composed of a polyurethane as main component and, optionally, having a segment such as polytetramethylene glycol may be employed as the polyurethane.

(14) Other thermoplastic resins.

As other thermoplastic resins, there may be mentioned, for example, (14a) a polyallylate, (14b) a polyphenylene sulfide, (14c) a polyether sulfone, (14d) a polyether ether ketone, (14e) a polyoxybenzylene and the like.

According to the present invention, two or more of the thermoplastic resins as mentioned above different in the repeating units is employed in a suitable combination. Preferably, such a plurality of the thermoplastic resins comprising a continuous phase and dispersed phase being incompatible with each other, particularly, different kinds of the thermoplastic resins are combinationally used.

Two or more species of the thermoplastic resins belonging to the same category may be employed as far as the islands-sea structure can be formed. Thus, a part of the repeating units in two or more of thermoplastic resins are the same or similar with each other, for example, a combination of polybutylene terephthalate and polyethylene terephthalate. Further, the two or more of the thermoplastic resins may be compatible in part. Preferably, the thermoplastic resins as the main components may frequently differ from each other in the solubility parameter SP, as a measure of the compatibility, by about 0.2 to 7 and preferably about 0.5 to 5.

The solubility parameter of the thermoplastic resins may vary by not only the repeating units but also the presence of modification and other factors, and the repeating units of commercially available thermoplastic resins are not specified in usual. Therefore, the solubility parameter of the thermoplastic resins can not be defined summarily in a word. Yet, the solubility parameter of conventional thermoplastic resins is described hereinafter for reference.

Preferred thermoplastic resin composition can comprise an adequate combination of (a) an olefinic polymer (SP equals 7.5 to 8.5), (b) an acrylic polymer (SP equals 9 to 10), (c) a styrenic polymer (SP equals 8 to 10.5), (d) a polycarbonate, (e) a polyester (SP equals 10 to 12), or (f) a polyamide (SP equals 12.5 to 14.5).

The thermoplastic resin composing the continuous phase can preferably be selected from polymers excellent in film forming properties, and include, for instance, an olefinic polymer (specifically polyethylene, polypropylene, an ethylene-propylene copolymer, etc.), a styrenic polymer (particularly, polystyrene, a rubber-modified impact resistant polystyrene, etc.), a polycarbonate (particularly, a bisphenol A-type polycarbonate and the like), a polyester (particularly, polyethylene terephthalate; polybutylene terephthalate, poly-1,4-dimethylol-cyclohexane terephthalate, etc.) and a polyamide (specifically, nylon 6, nylon 66, nylon 610, nylon 612, nylon 11, nylon 12 or others). The continuous phase of the film can preferably comprise an olefinic polymer, a styrenic polymer and a polyester.

More concretely, the dispersed phase or micro domain morphology dispersed in the continuous phase of (a) an olefinic polymer may comprise (b) an acrylic polymer, (c) a styrenic polymer, (d) a polycarbonate, (e) a polyester and (f) a polyamide. The dispersed phase can preferably comprise at least one thermoplastic resin selected from (c) a styrenic polymer, (d) a polycarbonate, (e) a polyester and (f) a polyamide.

The dispersed phase dispersed in the continuous phase of (c) a styrenic polymer may be constituted with (a) an olefinic polymer, (b) an acrylic polymer, (d) a polycarbonate, (e) a polyester and (f) a polyamide. Preferred dispersed phase can be formed with at least one thermoplastic resin selected from (a) an olefinic polymer, (e) a polyester and (f) a polyamide.

Further, the thermoplastic resin being preferably used in combination with (e) a polyester composing the continuous phase, and forming the dispersed phase may be at least one thermoplastic resin selected from (a) an olefinic polymer, (b) an acrylic polymer, (c) a styrenic polymer, (d) a polycarbonate and (f) a polyamide.

The thermoplastic resin for the dispersed phase which can preferably used in combination with (f) a polyamide forming the continuous phase may be at least one thermoplastic resin selected from (a) an olefinic polymer, (c) a styrenic polymer, (d) a polycarbonate and (e) a polyester.

The proportions of the thermoplastic resin for the continuous phase and the thermoplastic resin for the dispersed phase, is usually such that the continuous phase/the dispersed phase equals about 35 to 98/2 to 65 (% by weight), preferably about 50 to 95/5 to 50 (% by weight) and more preferably about 60 to 90/10 to 40 (% by weight). The tear properties of the film may be sacrificed when the proportions deviate from the prescribed range.

To these resin compositions may be added a component comprising a dispersing agent such as a compatibilizing agent having an affinity or compatibility to the continuous phase and/or the dispersed phase, and a surfactant. Addition of such component makes the dispersed resin particles finer with the tear strength and other properties of the film being adjusted, thus can advantageously improve the properties of the film.

As the compatibilizing agent, usually use is made of a polymer having the same or similar unit to the constituting-unit of the thermoplastic resin for the continuous phase and the constituting-unit of the thermoplastic resin for the dispersed phase. Further, the solubility parameter of the compatibilizing agent may frequently be intermediate between, or partly overlap with, the solubility parameter of the thermoplastic resin composing the continuous phase and that of the thermoplastic resin composing the dispersed phase. Thus, the compatibilizing agent can adequately be selected depending on the kind of two or more of the. thermoplastic resins.

The examples of the compatibilizing agent usable in combination with the thermoplastic resin for the continuous phase and the thermoplastic resin for the dispersed phase are shown as follows.

When using (a) an olefinic polymer and (b) an acrylic polymer and/or (e) a polyester in combination, the compatibilizing agent includes, for example, a modified polyolefin such as a maleic anhydride-modified polyolefin, a (meth) acrylic acid ester-olefin copolymer, a glycidyl (meth) acrylate-olefin copolymer and so on.

When using (a) an olefinic polymer and (c) a styrenic polymer in combination, as the compatibilizing agent, there may be mentioned, for example, an optionally hydrogenated or modified styrenic monomer-conjugated diene copolymer (e.g. a styrene-butadiene block-copolymer, a styrene-diene-styrene block copolymer, a styrene-olefin-(styrene) block copolymer, a maleic anhydride-modified styrene-diene-styrene block copolymer, a glycidyl (meth)acrylate-modified styrene-diene-styrene block-copolymer, etc.), an olefin-(meth)acrylic acid ester copolymer, an olefinic copolymer having a cyclic olefin unit, a chlorinated polyolefin, and others.

In case of combining (a) an olefinic polymer and (d) a polycarbonate, the compatibilizing agent may be exemplified as a modified polyolefin (for example, a maleic anhydride-olefin copolymer and a glycidyl (meth)acrylate-olefin copolymer), an olefinic polymer containing a cyclic olefin unit, an olefinic elastomer, an optionally hydrogenated or modified styrenic monomer-conjugated diene soft copolymer and the like.

In the use of (a) an olefinic polymer and (f) a polyamide in combination, the compatibilizing agent include, for example, a modified polyolefin such as a (meth)acrylic acid-olefin copolymer, a maleic anhydride-olefin copolymer and a glycidyl (meth)acrylate-olefin copolymer, an olefinic polymer having an cyclic olefin unit and so on.

Further, the compatibilizing agent may also include a copolymer formed with the olefin and styrenic monomer (e.g. "DYELARK" manufactured by Sekisui Chemical Co., Ltd, "LUREX" manufactured by Dainippon Ink Chemical Industries, Ltd., etc.), a copolymer formed with an olefin, a styrenic monomer and $\alpha,\beta$-ethylenically unsaturated carboxylic acid and/or $\alpha,\beta$-ethylenically unsaturated polycarboxylic acid or its acid anhydride (for instance, "NOVATECH AP" manufactured by Mitsubishi Kasei Co., Ltd., "MODIEC" manufactured by Mitsubishi Petrochemical Co., Ltd., or the like).

When use is made of (b) an acrylic polymer and (c) a styrenic polymer in combination, as examples of the compatibilizing agent, there may be mentioned a styrene-(meth) acrylic acid ester copolymer, a styrene-(meth)acrylic acid copolymer, a maleic anhydride-styrene copolymer, an optionally hydrogenated or modified styrenic monomer-conjugated diene soft copolymer or others.

In combination of (b) an acrylic polymer and (d) a polycarbonate, the compatibilizing agent include a styrene-(meth)acrylic acid ester copolymer, an optionally hydrogenated or modified styrenic monomer-conjugated diene soft copolymer and so on.

When using (b) an acrylic polymer and (e) a polyester in combination, the compatibilizing agent may be exemplified as a modified poly(meth)acrylic acid ester (e.g. an oxazoline-modified poly(meth)acrylic acid ester, a maleic anhydride-(meth)acrylic acid ester copolymer, a glycidyl (meth)acrylate-(meth)acrylic acid ester copolymer or others), a polyester elastomer and the like.

When employing (b) an acrylic polymer and (e) a polyamide in combination, as the compatibilizing agent, there may be mentioned, for example, a carboxyl-modified acrylic polymer, a maleic anhydride-modified acrylic polymer and so on.

In using a combination of (c) a styrenic polymer and (d) a polycarbonate, the compatibilizing agent include, for example, a vinyloxazoline-styrene copolymer, an epoxy-modified polystyrene (e.g. a glycidyl (meth)acrylate-styrene copolymer) and others.

When combining (c) a styrenic polymer and (e) a polyester, as the compatibilizing agent, there may be mentioned a modified polystyrene (for instance, an oxazoline-modified polystyrene, a maleic anhydride-styrene (acrylonitrile) copolymer, a (meth)acrylic acid-styrene copolymer, a glycidyl (meth)acrylate-styrene(acrylonitrile) copolymer) and so on.

In combination of (c) a styrenic polymer and (f) a polyamide, the compatibilizing agent may be exemplified with a modified polystyrene, a modified acrylonitriles-styrene copolymer, a (meth)acrylic acid-styrene copolymer, a maleic anhydride-styrene copolymer, a glycidyl (meth) acrylate-styrene copolymer or the like.

In case of using (d) a polycarbonate and (e) a polyester in combination, the compatibilizing agent includes, for example, a carboxyl-modified polyester, an epoxy-modified polyester and so on.

When (d) a polycarbonate and (f) a polyamide are used in combination, a modified polyamide, a modified styrenic polymer and the like can be used as the compatibilizing agent.

In using (e) a polyester and (f) a polyamide in combination, examples of the compatibilizing agent include a carboxyl-modified polyester, an epoxy-modified polyester and others.

The compatibilizing agent can be used independently or in combination, depending on the species of the thermoplastic resin for the continuous phase and the thermoplastic resin for the dispersed phase.

The adding amount of the compatibilizing agent is about 0.5 to 30 parts by weight, preferably about 1 to 25 parts by weight and more preferably about 2.5 to 20 parts by weight, relative to 100 parts by weight of the total weight of the thermoplastic resin composing the continuous phase and the thermoplastic resin constituting the dispersed phase. When the amount of the compatibilizing agent is less than 0.5 parts by weight, a sufficient effect of such addition can not be realized and when the amount excesses 30 parts by weight, the islands-sea structure may occasionally disappear.

The dispersed phase dispersed finely in the continuous phase of the film is oriented in the film drawing direction in a rod or fibrous form or structure with an average aspect ratio of 3 or more. When the dispersed phase is dispersed in the rod-like form, the aspect ratio thereof is 3 or more, and preferably about 3 to 50 (for instance, about 4 to 40). In case of dispersing in fibrous form, the aspect ratio of the dispersed phase may be 50 or more. The tear properties of the film may be sacrificed when the aspect ratio is less than 3.

There is no critical restriction on the form of the dispersed phase as far as the aspect ratio of the dispersed phase is 3 or more. Thus, the aspect ratio of the dispersed phase of 3 or more can afford the film excellent in the tear properties or tearability even when the dispersed phase is other structure than layer-structure, for instance, an island-structure in the cross section along the film drawing direction.

Furthermore, a film having a layer-structure of the dispersed phase in the cross section along the film drawing direction also gives specifically improved tear properties. The thickness of the dispersed phase per layer may be 1 $\mu$m or less, preferably about 0.01 to 1 $\mu$m and more preferably about 0.1 to 0.8 $\mu$m. When the dispersed phase is not in layers but spherical or other forms, the increased tearing force is required, and even if the film can be torn, the tearing direction may be oblique or whiskers may be formed. The thickness of the dispersed phase in layers is about 5% or less, preferably about 0.1 to 3%, and more preferably about 0.25 to 2.5%, based on the thickness of the film.

The preferred dispersed phase may, usually, be in the rod or fibrous form or shape having an aspect ratio of 3 or more (preferably about 3 to 50) and dispersed in layers or island-structure in the cross section along the film drawing direction.

The film having such a fine structure is significantly excellent in the transparency even when resins incompatible with each other are used in combination, with the initial tear resistance and tear propagation resistance being specifically reduced, thus it can easily or readily be torn in a straight line.

The aspect ratio observed from the surface of the film can be calculated based on a photograph taken with the use of a transmission electron microscope (hereinafter briefly referred to as TEM), a scanning electron microscope (hereinafter briefly referred to as SEM), confocal laser microscope or an optical microscope. Further, the structure of the dispersed particles can be observed more clearly by means of etching the dispersed component with a suitable organic solvent or others.

The average aspect ratio is a number-average value of the ratio of the length L of the dispersed particles in the longitudinal direction relative to the minimum width W of the dispersed particles, as shown in the following equation:

$$\text{Aspect ratio} = \frac{\text{Length of the dispersed particle in the longitudinal direction } L}{\text{Minimum width of the dispersed particles } W}$$

The shape and the dispersing form of the dispersed particles in the film can be investigated by observing, with TEM, the cross section of a ultrathin slice sliced parallel to the side end face of the film. It can also be examined by observing the end face cut and etched with a suitable organic solvent or the like with using SEM or a confocal laser microscope. The shape and the thickness of the dispersed particles observed from the side edge face of the film can be determined based on a photomicrograph.

The non-stretched film having such fine structure is characterized in that it has a practically sufficient strength with regard to the film drawing direction and the orthogonal direction relative to the film drawing direction, and additionally, it can be easily torn by hand almost straightly in at least either of the directions without whiskers.

In another embodiment of the present invention, the film composed of the under-mentioned compositions has a feature of exhibiting an excellently improved easy-tear properties even when the dispersed phase of the islands-sea structure does not have the above-mentioned aspect ratio or thickness. In this film, the dispersed phase is usually oriented to the film drawing direction. Further, the dispersed phase frequently has the aspect ratio and/or thickness or shape as above. Thus, the dispersed phase typically (1) is dispersed in the rod or fibrous form or structure with the aspect ratio of 3 or more (for example, about 3 to 50), (2) is dispersed in islands or layer form or structure with a thickness of 1 $\mu$m or less (e.g. about 0.01 to 1 $\mu$m, or (3) is of an aspect ratio of 3 or more and dispersed in islands or layer form or structure with a thickness of 1 $\mu$m or less.

Preferred examples of the composition comprising a plurality of the thermoplastic resins varying or different in the repeating units include following combinations:

(I) a combination of (c) a styrenic polymer and (e) a polyester, (II) a combination of (c) a styrenic polymer and (a) an olefinic polymer, and (III) a combination of (a) an olefinic polymer and (f) a polyamide.

In the combination (I) just mentioned above, a styrenic polymer having transparency or a rubber-modified impact resistant polystyrene can advantageously be used as the styrenic polymer. When utilizing (I) the combination of the styrenic polymer and the polyester, the proportions thereof are, for example, such that the styrenic polymer/the polyester equals about 15 to 98/85 to 2 (% by weight), and preferably about 1.5 to 85/85 to 15 (% by weight). Among these compositions, the film obtainable from a composition containing a transparent styrenic polymer is highly improved not only in transparency but also in the easy-tear properties and heat resistance.

When using a combination of the rubber-modified impact resistant polystyrene and the polyester in the combination (I), the proportion thereof is, for example, the rubber-modified impact resistant polystyrene/the polyester =about 50 to 98/2 to 50 (% by weight), and preferably about 60 to 90/10 to 40 (% by weight).

In the combination (II), various polymers mentioned above can be used as the styrenic polymer. Examples of the preferred styrenic polymer include polystyrene, a rubber-modified impact resistant polystyrene and a mixture of these polymers.

The ratio of the styrenic polymer to the olefinic polymer may be, for example, the styrenic polymer/the olefinic polymer=about 40 to 90/10 to 60 (% by weight), preferably about 50 to 90/10 to 50 (% by weight), and more preferably about 50 to 80/20 to 50 (% by weight).

Addition of, for instance, a hydrogenated styrenic monomer-conjugated diene copolymer to the styrenic polymer and the olefinic polymer further enhances the easy-tear properties of the film. It is supposed that the hydrogenated copolymer may act as the compatibilizing agent.

The amount of the hydrogenated copolymer is, for instance, from about 0.5 to 25 parts by weight, preferably from about 2 to 20 parts by weight, and more preferably from about 5 to 20 parts by weight, relative to 100 parts by weight of the resin composition of the styrenic polymer and the olefinic polymer.

In the combination (III), the ratio of the olefinic polymer to the polyamide can be selected from a suitable range, and is, in order to improve the transparency of the film, such that the olefinic polymer/the polyamide equals about 65 to 95/35 to 5 (% by weight), preferably about 70 to 92/30 to 8 (% by weight) and more preferably about 73 to 87/27 to 13 (% by weight).

The film formed by one of the compositions (I) to (III) can easily be torn at least in either direction of the film drawing direction (machine direction, hereinafter referred to as MD direction) and the orthogonal direction relative to the film drawing direction (transverse direction, hereinafter referred to as TD direction). In one direction of the film, the right angle type tear strength as defined in JIS K 6732-1953 is 150 kg/cm or less, preferably about 5 to 120 kg/cm and more preferably about 30 to 100 kg/cm, and the Elmendorf tear strength as prescribed in JIS Z 1702 is 10 kg/cm or less, preferably about 0.2 to 7.5 kg/cm, and more preferably about 0.5 to 7 kg/cm. When the right angle type tear strength is 30 kg/cm or more, usually the film is excellent in the tear properties and has a practically sufficient strength.

Particularly, the film formed with the compositions (I) and (II) can easily torn in both directions of the MD direction and the TD direction of the film. This film has the right angle type tear strength of 150 kg/cm or less, and preferably about 5 to 120 kg/cm, and the Elmendorf tear strength of 10 kg/cm or less and preferably about 1 to 10 kg/cm, respectively in both directions of the MD direction and the TD direction.

Concerning the tearing test of plastic films and sheets, JIS Z 1702, JIS K 6732 and JIS C 2318 respectively define the Elmendorf tear test, the right angle type tear resistance test and the edge-tear resistance test, as mentioned above. The Elmendorf tear resistance test and the right angle type tear resistance test are, however, conducted for a notch-formed film, therefore, the values thus obtained may occasionally be discord with the resistant values obtained by tearing a film without any notch by hand. Moreover, since the edge-tear resistance test is conducted by passing a strip of a film through the communicating port of the jig formed at an angle of 150° and pulling the film, a data far from the feeling actually gained by tearing a film with hand may be obtained.

On the other hand, in taking a film between fingers or others and tearing it actually, torque and tensile force act on the test piece (film). Thus, in order to determine the tear properties corresponding to the actual tearing, the tearing maximum torque and the tearing maximum normal force (tensile force) in the present invention may be determined by a rotary tearing test method.

The easy tearable film of the present invention with the dispersed phase in the islands-sea structure having the aspect ratio and/or thickness shows, at least in one direction, the tearing maximum torque of 60 g-cm/gm or less, (usually about 5 to 60 g·cm/$\mu$m, and preferably about 10 to 50 g·cm/$\mu$m), or the tearing maximum normal force of 10 g/$\mu$m or less (usually about 0.5 to 10 g/$\mu$m).

Figure 2:
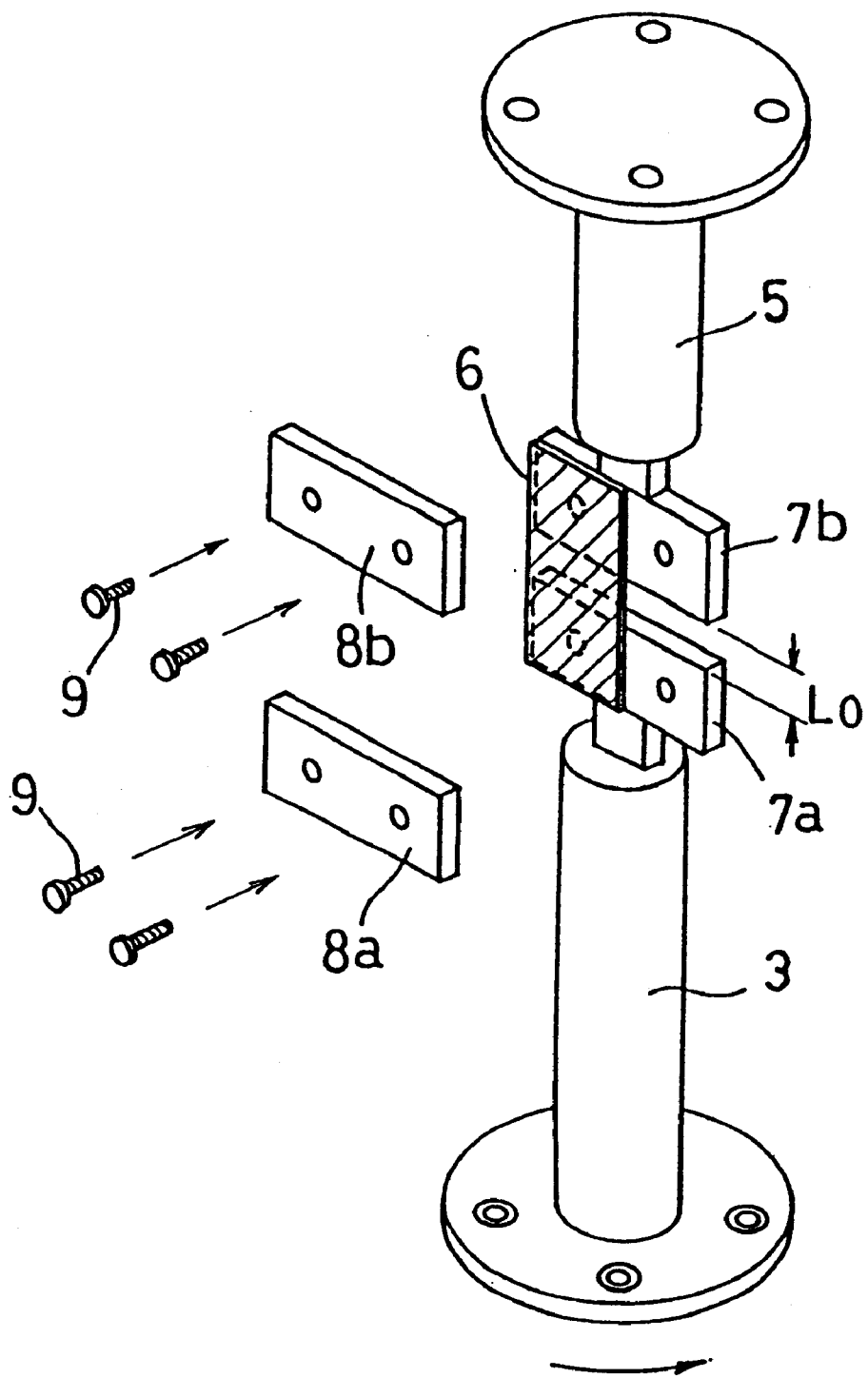
FIG. 2 is a disassembled perspective view illustrating a principal portion of the apparatus shown in FIG. 1.

FIG. 1 is a schematic perspective view illustrating a rotary type tearing test apparatus and FIG. 2 is a disassembled perspective view illustrating a principal portion of the apparatus of FIG. 1.

The apparatus provides with a rotary rod 3 which is exchangeably attached to an attaching member 1 and driven rotatably by a fixed motor 2, and a rod 5 which is exchangeably attached to an attaching member 4 at a predetermined distance from the rotary rod 3. In this embodiment, the upper rod 5 is utilized for detecting the torque and the tensile force.

The end portions of the rods 3, 5 opposed each other are formed flat fixing sites 7*a*, 7*b*, and at the fixing sites, a film 6 is interposed and held by chucking members 8*a*, 8*b* as a holding means. That is, the chucking members 8*a*, 8*b* are mounted to the fixing sites 7a, 7b by screws 9 with pressing the film 6 against the fixing sites.

The determination point of the film 6 apparts from the position of the axial center of the rods 3, 5. Further, a pair of the chucking members 8a, 8b are opposed each other at a distance of about 0.5 to 2 mm corresponding to the distance between the fixing sites 7a and 7b.

In such equipment, when the motor 2 is rotated, torque and normal force (tensile force) act on the film 6. The torque acting on the film 6 is detected by a strain gauge 10b of a force measuring unit 10 affixed to the rod 5, and the tensile force is detected by a strain gauge 10b of the force measuring unit 10. The values detected by the strain gauges 10a, 10b are respectively supplied to a recorder 11 to be recorded.

Accordingly, the maximum torque and the maximum normal force brought about with tearing of the film 6 can be read from a chart of the recorder 11. The tearing maximum torque and the tearing maximum normal force in the present invention are the values determined at a distance of 1 mm between a pair of upper and lower chucks, at a rotary rate of the rod of 0.1 rpm and at room temperature.

Figure 3:
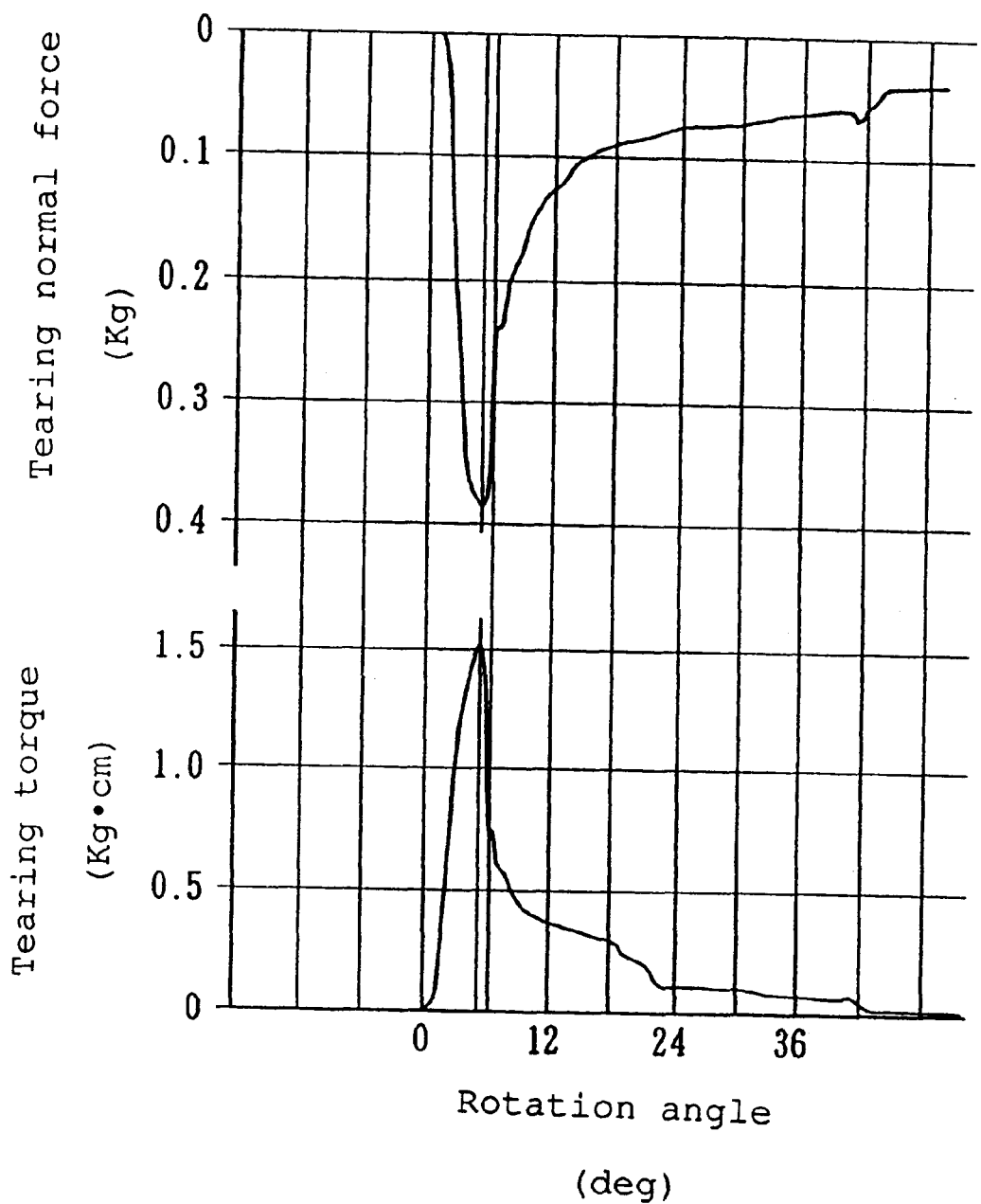
FIG. 3 is a chart showing results of the determination of tearing torque and tearing normal force of a film.

FIG. 3 shows an example of the chart determining the tearing torque and the tearing normal force of the film comprising polystyrene as the continuous phase and polyethylene as the dispersed phase using the apparatus. In FIG. 3, one scale of the abscissa indicates a rotation angle of 6 deg/cm.

The tearing maximum torque represents a value obtained by dividing the maximum torque (g·cm) produced with the tearing of the film by the thickness of the film ($\mu$m), and the tearing maximum normal force is a value obtained by dividing the maximum normal force (g) produced with the tearing of the film by the thickness of the film ($\mu$m).

The tearing maximum torque (g·cm/$\mu$m) and the tearing maximum normal force (g/$\mu$m) determined using the above mentioned apparatus minimize the variation of determination, and sufficiently correspond to the resistant feeling of tearing a film without forming any notch. Further, the film having a tearing maximum torque of 60 g·cm/$\mu$m or less, or the film having a tearing maximum normal force of 10 g/$\mu$m or less is easily tearable by hand and has a small initial resistant feeling for tearing.

In the easy tearable film of the present invention in which the dispersed phase of the islands-sea structure has the above mentioned aspect ratio and/or thickness, the ratio Etd/Emd of the rupture elongation Etd in the orthogonal direction relative to the film drawing direction to the rupture elongation Emd in the film drawing direction is 50% or less, preferably 40% or less and more preferably about 5 to 40%. The ratio Etd/Emd of 50% or less can provide the film capable of easy tearable in one direction, and the ratio exceeding 50% makes the tear properties of the film tend to be sacrificed. The film having a rupture elongation of 20% or more has, usually, a sufficient strength in practical use.

The film of the invention is characterized in that, even when unstretched, it can extremely easily be torn in the orthogonal direction relative to the film drawing direction, although having practically sufficient strength in both direction of the film drawing direction and the orthogonal direction relative to the film drawing direction. Therefore, the film of the invention can exceedingly be easy to tear straightforwardly without being scored or formed with notches, or intensively stretched as a conventional film. In the broken-out section of the film, there is no occurrence of whisker or others. In addition, since no score or others is required to be formed, when packaging an article with the film to isolate from the exterior atmosphere, the article can stably be maintained in the initial package conditions for a long period of time. Moreover, unnecessity of stretching of the film can prevent the formation of wrinkles or rumples even when sealed by, for instance, heat-sealing.

The properties of the film of the present invention such as the tear strength and rupture strength may be controlled or adjusted by uniaxially or biaxially stretching. The stretching magnification at least in one direction can suitably be selected from the range of, for example, about 1.1 to 2.5 times.

The thickness of the easy tearable film is, for example, about 5 to 100 $\mu$m and preferably about 8 to 50 $\mu$m.

The easy tearable film of the invention may be coated with a coating layer and/or a laminating layer such as a lubricating layer or a gas-barrier layer, as far as the tear properties of the film are not adversely affected. The film may be subjected to a surface treatment such as corona discharge treatment, flame treatment, ultrasonic treatment and plasma treatment. The film may further contain a variety of additives including heat-resistant and light-resistant stabilizers such as antioxidants and ultraviolet absorbers, plasticizers, antistatic agents, lubricants, dyestuff and pigments, fillers and the like.

The easy tearable film of the present invention can be produced by a conventional manner such as an extrusion molding with a T-die or an inflation molding.

In T-die molding, a resin composition comprising two or more of thermoplastic resins varying in repeating units as main components are melted with an extrusion molding machine and extruded from a T-die to produce a film without stretching.

In the inflation molding, when the molten resin composition is extruded from an annular die (circular die), the film can be produced by film formation with a ratio (deformation ratio) V/D of a draw ratio (melting-stretching ratio) V relative to a blow ratio (inflation ratio) D being about 0.5 to 8, preferably about 0.5 to 5, and more preferably about 0.5 to 3. When the deformation ratio is less than 0.5, the tearing resistance may be increased in the orthogonal direction relative to the film draw direction and, therefore, it is difficult to obtain a film having an improved tear properties in one direction. On the contrary, when the deforming ratio exceeds 8, the stability of a bubble may significantly be sacrificed, thus the film formation tends to be difficult.

The term "draw ratio" V mentioned above means a ratio $V_2/V_1$ of the drawing velocity $V_2$ of the molded film relative to the discharge velocity $V_1$ of the molten resin from an annular die lip. The term "blow ratio" D refers the ratio $_2/d_1$ of a diameter $d_2$ of the drawing annular film relative to a diameter $d_1$ of the annular die lip. The draw ratio and the blow ratio can be selected from a suitable range in which the tear properties of the film are not adversely affected, for example, the draw ratio and the blow ratio are about 1 to 20 and about 1 to 10 respectively.

With the use of inflation molding, the easy tearable film can be obtained with a small deformation ratio, therefore, a high-quality film can be produced with a high stability of the bubble in film formation and with few wrinkles or rumples, looseness or fluctuation of folding width.

According to the above-mentioned method, the easy-tear properties can be exhibited without stretching treatment so as to save the time and cost for stretching treatment and to enhance the productivity of the film remarkably.

The two or more of the thermoplastic resins may be blended or mixed and supplied to an extrusion machine, and the supplied is melted and kneaded in the extrusion machine, to disperse the thermoplastic resins. Alternatively, pellets obtainable by previously melting and kneading a composition containing the two or more of the thermoplastic resins as the main components may be fed to the extrusion machine. The mixture comprising two or more of the thermoplastic resins as the main components can be prepared in a conventional manner, for example, using a mixer or blender such as a ribbon blender, a tumble mixer and a Henshell mixer. The pellet can be prepared by using an open roll, a Banbury mixer, a uniaxially screw extrusion machine, a biaxially extrusion machine and a uniaxial reciprocating screw kneader.

The easy tearable film of the present invention can be utilized not only as a mono-layer film but also as an easy tearable laminate or lamina wherein the film is laminated on a base layer. Accordingly, when the easy tearable film is laminated on, for instance, an aluminium foil usable as a covering member in PTP (Press Through Pack) package and the like, the covering member or the film can easily be broken by pressing the bottom of the container even when the breaking strength of the container is not so increased, thus an article such as tablets can readily be taken out. When the easy tearable film is laminated on a paper such as a craft paper to provide a sealed sack or pouch, the resulting sack or pouch can be easily torn along with the tearing direction of the paper without an excessive increase of the tear resistance. Further, when the film is used as a seal film for sealing a takeoff opening for liquid in a package such as of a brick-size package, the sealing can be smoothly broken through or cut by a straw or the like.

As the base layer, there may be mentioned readily-breakable base materials, for instance, a uniaxially or biaxially stretched film composed of a polymer such as an olefinic polymer including polyethylene and polypropylene, polyvinyl chloride, a polyester such as polyethylene terephthalate, a styrenic polymer and the like; a paper such as a glassine paper, a simili or imitation Japanese vellum, and a white card board; metal foils such as aluminum; and the like.

These laminates can be prepared by a conventional manner, for example, by laminating the easy tearable film on the readily-breakable base layer using an adhesive or by extruding a molten resin composition into a film from a die and laminating the film onto the base layer. When the base layer is a heat adhesive film comprising, for example, an olefinic polymer or a styrenic polymer, the easy tearable film may also be laminated on the base layer by heating and compressing the film to be fused.

According to the present invention, the film which is easy tearable at least in one direction can be obtained. Further, the film having a high mechanical anisotropy can also be prepared, and such film has an excellent easy-tear properties in one direction with a practically sufficient strength in the orthogonal direction relative to the direction. The easy tearable film can be produced without using a specialized polymer or a stretching treatment. Furthermore, the film of the invention is also excellent in transparency.

INDUSTRIAL APPLICABILITY

The easy tearable film of the present invention may be applied to a variety of uses such as packaging sack or pouch, base materials for adhesive tapes, brick-size package or PTP (Press Through Pack) package usable in piece-packaging for tablets and the like.

EXAMPLES

The following Examples illustrate the invention in further detail but are by no means limitative of the scope thereof.

In the following manners, tests were conducted to measure the rotary tearing resistance, easy-tear properties of the film, tensile rupture elongation and aspect ratio of the dispersed particles, and was observed the shape of the dispersed particles.

1. Rotary Tear Resistance

A test piece of 14 mm in width was attached or fixed to the chucking area shown in FIG. 1, and the rod was rotated at a rate of 0.1 rpm with the gap between the upper chuck and lower chuck being set at 1 mm. The rod was rotated through 180 and the maximum values of the torque and the normal force (tensile force) acting, with rotation, on the test piece were determined from a chart. The maximum tearing torque (g·cm/$\mu$m) and the maximum tearing normal force (g/$\mu$m) were evaluated by dividing the maximum torque and the maximum normal force by the thickness of the test piece respectively.

2. Easy-tear Properties

Using both hands, a test piece of the film having a thickness of 40 $\mu$m was broken from the edge, and the tear properties were evaluated by the following criteria.

Excellent: The test piece could be broken as easily as cellophane or more, and the broken-out section of the film was in a straight line with scarce whiskers Fine: The test piece could be broken as easily as cellophane or more but the broken-out section was diagonal or whiskers were produced in the broken-out section Good: The test piece could be broken, but the breaking or tear properties thereof were inferior to cellophane Failure: The test piece was hard to be broken and the shape of the broken-out section was disordered 3. Tensile Rupture Elongation The tensile rupture elongation was measured according to JIS-Z1702-1976 using a strip of test piece (10 mm in width, 100 mm in length) at a tensile rate of 300 mm per minute. The values were expressed by a unit of 4. Aspect Ratio of Dispersed Particles The dispersed particles in the film were observed from the surface of the film and were photographed with an optical microscope, a scanning electron microscope (SEM), a transmission electron microscope or a confocal laser microscope. The average aspect ratio was calculated based on thus-obtained photographs.

5. Shape of Dispersed Particles

A slice was cut off from the end of the film and dyed with osmic acid, ruthenic acid, iodine or the like, then observed with a transmission electron microscope (TEM). Regarding the thickness of the dispersed particles in layers, a number-average thickness ($\mu$m) was determined in a similar manner as above.

For a sample wherein a clear structure of the dispersed particles could not be observed, the film was ruptured along with the film drawing direction, and the ruptured section was observed with a scanning electron microscope or a confocal laser microscope.

Examples 1 to 28 and Comparative Example 1

The undermentioned thermoplastic resins were stirred and blended in proportions shown in Tables 1 to 8 using a Henshell mixer. The resultant resin composition was heated and kneaded using an extrusion machine (65 mm $\phi$) to produce pellets. The pellets thus obtained were molded into a film (40 $\mu$m in thickness) by an inflation molding method under the following conditions;

| | |
|---|---|
| Aperture of film forming equipment | 40 mm φ |
| Aperture of extrusion machine | 40 mm φ |
| Die Aperture | 50 mm φ |
| Gap | 1 mm |
| Film forming conditions: | |
| Temperature | 170 to 280° C. |
| Discharging amount | 40 kg/hr |
| Deforming ratio | 1.5 |

The film-forming temperature was selected from the above-mentioned range in accordance with the species of the thermoplastic resins. The results are shown in Table 1 to Table 8. In these Tables, the term "MD" refers to the film drawing direction and the term "TD" refers to the orthogonal direction relative to the film drawing direction. As apparent from these Tables, the films obtained in Examples 1 to 28 are excellent in tear properties.

Polymers used in the Examples and Comparative Example and the marks respectively representing the polymers are as follow.

a. Olefinic polymers
   A low density polyethylene (LDPE):
     SUMICASEN L FA101-1, manufactured by Sumitomo Chemical Co., Ltd.
   A linear low density polyethylene (LLDPE):
     TUF2030, manufactured by Nippon Unicar Co., Ltd.
   Polypropylene (PP):
     UNIPOLY YK-121, manufactured by Union Polymer Co., Ltd.
   An ethylene propylene rubber (EPR):
     EP07P, manufactured by Nippon Goseigomu Co., Ltd.

b. Acrylic polymers
   Polymethyl methacrylate (PMMA):
     SUMIPEC BL06, manufactured by Sumitomo Chemical Co., Ltd.

c. Styrene Polymers
   Polystyrene (GPPS):
     SUMIBRIGHT M140, manufactured by Sumitomo Chemical Co., Ltd.
   A rubber-modified impact resistant polystyrene (HIPS):
     SUMIBRIGHT M584, manufactured by Sumitomo Chemical Co., Ltd.
   An acrylonitrile-butadiene-styrene copolymer (ABS):
     CEBIEN 660SF, manufactured by Daicel Chemical Industries Ltd.
   A methacrylic acid-modified polystyrene (St-MAA):
     LUREX A15, manufactured by Dainippon Ink Chemical Industries Co., Ltd.
   A hydrogenated styrene-butadiene-styrene block copolymer (SEBS):
     CLAYTON G1652, manufactured by Shell Chemical Co., Ltd.
   A maleic anhydride-modified SEBS (SEBS-Mah):
     TUFTECH M1913, manufactured by Asahi Kasei Co., Ltd.
   A maleic anhydride-modified polystyrene (St-Mah):
     DYELARK 332, manufactured by Sekisui Kaseihin industries, Ltd.
   A styrene-methyl methacrylate copolymer (St-MMA):
     MS300, manufactured by Shinnittetsu Chemical Co., Ltd.
   A styrene-ethylene-propylene-styrene block copolymer (SEPS):
     SEPTON 2002, manufactured by Kuraray Co., Ltd.
   A styrene-butadiene block copolymer (SB):
     TR 2400, manufactured by Nippon Synthetic Rubber Co., Ltd.

d. Polycarbonates
   Polycarbonate (PC):
     EUPYLON S-3000, manufactured by Mitsubishi Gas Chemical Co., Ltd.

e. Polyesters
   Polyethylene terephthalate (PET):
     J005, manufactured by Mitsui Petrochemical Industries Ltd.
   Polybutylene terephthalate (PBT):
     DURANEX 600FP, manufactured by Polyplastics Co., Ltd.

f. Polyamides
   Nylon 6 (Ny6):
     UBENYLON 6 1013B, manufactured by Ube Industries
   Nylon 12 (Nyl2):
     DIAMIDE L2106F, manufactured by Daicel-Hulles Co., Ltd.
   A polyamide elastomer (a copolymer of polytetrahydrofuran and nylon 12):
     DH E40, manufactured by Daicel-Hulles Co., Ltd.

TABLE 1

| | Resin Composition | | Tearing Maximum Torque (g · cm/μm) | | Tearing Maximum Normal Force (g/μm) | |
|---|---|---|---|---|---|---|
| | Component 1 (weight %) | Component 2 (weight %) | MD | TD | MD | TD |
| Ex. 1 | PP (80) | PBT (20) | 78 | 20 | 20 | 2 |
| Ex. 2 | PP (80) | PET (20) | 70 | 15 | 18 | 2 |
| Ex. 3 | PP (80) | PC (20) | 75 | 23 | 19 | 2 |
| Ex. 4 | PP (80) | Ny6 (20) | 66 | 17 | 17 | 2 |

TABLE 1-continued

| | Resin Composition | | Tearing Maximum Torque (g·cm/μm) | | Tearing Maximum Normal Force (g/μm) | |
|---|---|---|---|---|---|---|
| | Component 1 (weight %) | Component 2 (weight %) | MD | TD | MD | TD |
| Ex. 5 | PP (80) | Ny12 (20) | 85 | 14 | 22 | 1 |
| Ex. 6 | PBT (80) | PP (20) | 79 | 28 | 20 | 3 |
| Ex. 7 | PBT (80) | PET (20) | 52 | 55 | 13 | 6 |
| Ex. 8 | PBT (80) | PC (20) | 110 | 53 | 14 | 9 |
| Ex. 9 | PBT (80) | GPPS (20) | 58 | 16 | 15 | 2 |
| Ex. 10 | PBT (80) | St-MMA (20) | 47 | 42 | 12 | 4 |

TABLE 2

| | Resin Composition | | Aspect Ratio of Dispersed Particles | Shape of Dispersed Particles (Number-Average Thickness μm) | Easy-Tear Properties | Rupture Elongation | |
|---|---|---|---|---|---|---|---|
| | Component 1 (weight %) | Component 2 (weight %) | | | | MD | TD |
| Ex. 1 | PP (80) | PBT (20) | 20< | Layer (0.3) | Excellent | 200< | 45 |
| Ex. 2 | PP (80) | PET (20) | 12.4 | Layer (0.2) | Excellent | 200< | 53 |
| Ex. 3 | PP (80) | PC (20) | 10.3 | Layer (0.5) | Excellent | 200< | 42 |
| Ex. 4 | PP (80) | Ny6 (20) | 9.6 | Layer (0.5) | Excellent | 200< | 50 |
| Ex. 5 | PF (80) | Ny12 (20) | 13.8 | Layer (0.4) | Excellent | 200< | 62 |
| Ex. 6 | PBT (80) | PP (20) | 15.2 | Layer (0.2) | Excellent | 200< | 45 |
| Ex. 7 | PBT (80) | PET (20) | 4.6 | Island-structure | Excellent | 200< | 72 |
| Ex. 8 | PBT (80) | PC (20) | 4.9 | Island-structure | Excellent | 200< | 30 |
| Ex. 9 | PBT (80) | GPPS (20) | 5.5 | Island-structure | Excellent | 200< | 25 |
| Ex. 10 | PBT (80) | St-MMA (20) | 5.7 | Island-structure | Excellent | 180 | 62 |

TABLE 3

| | Resin Composition | | Tearing Maximum Torque (g·cm/μm) | | Tearing Maximum Normal Force (g/μm) | |
|---|---|---|---|---|---|---|
| | Component 1 (weight %) | Component 2 (weight %) | MD | TD | MD | TD |
| Ex. 11 | PBT (80) | St-MAA (20) | 36 | 29 | 9 | 3 |
| Ex. 12 | PBT (80) | PMMA (20) | 58 | 38 | 15 | 4 |
| Ex. 13 | PBT (80) | HIPS (20) | 48 | 45 | 12 | 5 |
| Ex. 14 | PBT (80) | ABS (20) | 68 | 47 | 16 | 7 |
| Com. Ex. 1 | PBT (100) | — | 105 | 77 | 20 | 11 |

TABLE 4

| | Resin Composition | | Aspect Ratio of Dispersed Particles | Shape of Dispersed Particles (Number-Average Thickness μm) | Easy-Tear Properties | Rupture Elongation | |
|---|---|---|---|---|---|---|---|
| | Component 1 (weight %) | Component 2 (weight %) | | | | MD | TD |
| Ex. 11 | PBT (80) | St-MAA (20) | 3.9 | Island-structure | Excellent | 125 | 25 |
| Ex. 12 | PBT (80) | PMMA (20) | 10.6 | Layer (0.7) | Excellent | 200< | 53 |
| Ex. 13 | PBT (80) | HIPS (20) | 6.2 | Layer (0.6) | Excellent | 200< | 31 |
| Ex. 14 | PBT (80) | ABS (20) | 5.1 | Layer (0.4) | Excellent | 200< | 37 |
| Com. Ex. 1 | PBT (100) | — | — | — | Failure | 200< | 200< |

TABLE 5

| | Resin Composition | | | | Tearing Maximum Torque (g · cm/μm) | | Tearing Maximum Normal Force (g/cm) | |
|---|---|---|---|---|---|---|---|---|
| | Component 1 (weight %) | Component 2 (weight %) | Component 3 (weight %) | Component 4 (weight %) | MD | TD | MD | TD |
| Ex. 15 | HIPS (38.3) | LLDPE (31.7) | GPPS (20) | SEBS (10) | 41 | 24 | 8 | 7 |
| Ex. 16 | HIPS (58.3) | LLDPE (31.7) | SEBS (10) | | 43 | 25 | 6 | 7 |
| Ex. 17 | HIPS (58.3) | LDPE (28.5) | EPR (3.2) | SEBS (10) | 47 | 39 | 10 | 4 |
| Ex. 18 | GPPS (58.5) | LDPE (28.5) | EPR (3.2) | SEBS (10) | 53 | 37 | 12 | 4 |
| Ex. 19 | GPPS (57) | PBT (38) | SEBS-Mah (5) | | 52 | 48 | 12 | 7 |
| Ex. 20 | GPPS (57) | Ny6 (38) | SEBS-Mah (5) | | 51 | 36 | 15 | 5 |
| Ex. 21 | GPPS (57) | Ny6 (38) | St-Mah (5) | | 41 | 28 | 8 | 6 |

TABLE 6

| | Resin Composition | | | | Aspect Ratio of Dispersed Particles | Shape of Dispersed Particles (Number-Average Thickness μm) | Easy-Tear Properties | Rupture Elongation | |
|---|---|---|---|---|---|---|---|---|---|
| | Component 1 (weight %) | Component 2 (weight %) | Component 3 (weight %) | Component 4 (weight %) | | | | MD | TD |
| Ex. 15 | HIPS (38.3) | LLDPE (31.7) | GPPS (20) | SEBS (10) | 20< | Layer (0.3) | Excellent | 132 | 49 |
| Ex. 16 | HIPS (58.3) | LLDPE (31.7) | SEBS (10) | | 20< | Layer (0.2) | Excellent | 180 | 65 |
| Ex. 17 | HIPS (58.3) | LDPE (28.5) | EPR (3.2) | SEBS (10) | 20< | Layer (0.2) | Excellent | 175 | 29 |
| Ex. 18 | GPPS (58.5) | LDPE (28.5) | EPR (3.2) | SEBS (10) | 20< | Layer (0.3) | Excellent | 122 | 29 |
| Ex. 19 | GPPS (57) | PBT (38) | SEBS-Mah (5) | | 20< | Layer (0.5) | Excellent | 53 | 17 |
| Ex. 20 | GPPS (57) | Ny6 (38) | SEBS-Mah (5) | | 20< | Layer (0.7) | Excellent | 47 | 17 |
| Ex. 21 | GPPS (57) | Ny6 (38) | St-Mah (5) | | 20< | Layer (0.7) | Excellent | 36 | 10 |

TABLE 7

| | Resin Composition | | | Tearing Maximum Torque (g·cm/μm) | | Tearing Maximum Normal Force (g/cm) | |
| | Component 1 (weight %) | Component 2 (weight %) | Component 3 (weight %) | MD | TD | MD | TD |
|---|---|---|---|---|---|---|---|
| Ex. 22 | HIPS (66.3) | Polyamide Elastomer (28.7) | St-Mah (5) | 99 | 46 | 10 | 5 |
| Ex. 23 | HIPS (66.3) | PP (28.7) | SEPS (5) | 72 | 46 | 12 | 5 |
| Ex. 24 | HIPS (80) | PBT (20) | | 87 | 44 | 21 | 5 |
| Ex. 25 | LLDPE (80) | Ny6 (20) | | 77 | 31 | 21 | 5 |
| Ex. 26 | PBT (71.3) | GPPS (23.7) | SB (5) | 109 | 46 | 10 | 4 |
| Ex. 27 | HIPS (68.4) | Ny12 (26.6) | St-MAA (5) | 48 | 30 | 12 | 6 |
| Ex. 28 | HIPS (68.4) | Ny12 (26.6) | SEBS-Mah (5) | 61 | 45 | 13 | 5 |

TABLE 8

| | Resin Composition | | | Aspect Ratio of Dispersed Particles | Shape of Dispersed Particles (Number-Average Thickness μm) | Easy-Tear Properties | Rupture Elongation | |
| | Component 1 (weight %) | Component 2 (weight %) | Component 3 (weight %) | | | | MD | TD |
|---|---|---|---|---|---|---|---|---|
| Ex. 22 | HIPS (66.3) | Polyamide Elastomer (28.7) | St-Mah (5) | 4.2 | Island-structure | Excellent | 81 | 25 |
| Ex. 23 | HIPS (66.3) | PP (28.7) | SEPS (5) | 20< | Layer (0.8) | Excellent | 123 | 38 |
| Ex. 24 | HIPS (80) | PBT (20) | | 20< | Layer (0.5) | Excellent | 89 | 26 |
| Ex. 25 | LLDPE (80) | Ny6 (20) | | 20< | Layer (0.4) | Excellent | 200< | 64 |
| Ex. 26 | PBT (71.3) | GPPS (23.7) | SB (5) | 7.2 | Island-structure | Excellent | 157 | 27 |
| Ex. 27 | HIPS (68.4) | Ny12 (26.6) | St-MAA (5) | 20< | Layer (0.3) | Excellent | 122 | 31 |
| Ex. 28 | HIPS (68.4) | Ny12 (26.6) | SEBS-Mah (5) | 20< | Layer (0.4) | Excellent | 115 | 42 |

Examples 29 to 33

Thermoplastic resins were blended in a proportion shown in Table 9 and molded into a film (40 μm in thickness) by T-die extrusion molding. The following thermoplastic resins were used in these Examples in addition to the thermoplastic resins used in Examples 1 to 28.

A rubber-modified impact resistant polystyrene (HIPS):
SUMIBRIGHT M584, manufactured by Sumitomo Chemical Co., Ltd.

An acrylonitrile-butadiene-styrene copolymer (ABS):
CEBIEN V660SF, manufactured by Daicel Chemical Industries, Ltd.

A polyester elastomer:
HITRAYLE 674, manufactured by Toray-Dupont Co., Ltd.

The right angle type tear strength (JIS K-6732-1953) and Elmendorf tear strength (JIS Z-17029) in the MD direction and the TD direction of the film were measured, and easy-tear properties were evaluated in the same manner as above. The results are shown in Table 9. As clearly indicated in Table 9, the film obtained in Examples 29 to 33 are excellent in easy tearable properties and can be easily torn both in the MD direction and in the TD direction.

TABLE 9

| | Resin Composition | | Right Angle Type Tear Strength (kg/cm) | | Elmendorf Tear Strength (kg/cm) | | Easy-Tear |
|---|---|---|---|---|---|---|---|
| | Component 1 (weight %) | Component 2 (weight %) | MD | TD | MD | TD | Properties |
| Ex. 29 | HIPS (80) | Polyester Elastomer (20) | 111 | 47 | 4.6 | 1.1 | Excellent |
| Ex. 30 | HIPS (80) | PET (20) | 87 | 26 | 1.7 | 0.4 | Excellent |
| Ex. 31 | HIPS (80) | PET (20) | 15 | 12 | 5.1 | 1.4 | Excellent |
| Ex. 32 | ABS (80) | PBT (20) | 75 | 36 | 4.0 | 2.7 | Excellent |
| Ex. 33 | ABS (80) | PET (20) | 91 | 22 | 5.3 | 2.5 | Excellent |

Examples 34 to 42 and Comparative Example 2

In a proportion shown in Table 10, thermoplastic resins were blended and the resultant mixture was submitted to extrusion-molding with the use of T-die into a film (40 μm in thickness). In these Examples, the following thermoplastic resins were employed other than the thermoplastic resins used in Examples 1 to 28.

were determined, and easy-tear properties were evaluated in the same manner as mentioned above. Further, the light transmittance was determined in a manner according to JIS K 7105.

The results are shown in Table 10. As apparent from Table 10, the films of Examples 34 to 42 are superior in tear properties both in the MD direction and in the TD direction as well as in transparency.

TABLE 10

| | Resin Composition | | Right Angle Type Tear Strength (kg/cm) | | Elmendorf Tear Strength (kg/cm) | | Easy-Tear | Transparency (Light Trans- |
|---|---|---|---|---|---|---|---|---|
| | Component 1 (weight %) | Component 2 (weight %) | MD | TD | MD | TD | Properties | mittance) (%) |
| Ex. 34 | PBT (80) | GPPS (20) | 202 | 40 | 13.0 | 4.0 | Excellent | 90 |
| Ex. 35 | GPPS (80) | Polyester Elastomer (20) | 119 | 39 | 2.8 | 0.7 | Excellent | 91 |
| Ex. 36 | GPPS (80) | PBT (20) | 65 | 9 | 4.3 | 1.2 | Excellent | 91 |
| Ex. 37 | GPPS (80) | PET (20) | 32 | 9 | 2.9 | 1.9 | Excellent | 95 |
| Ex. 38 | St-MMA (80) | PBT (20) | 61 | 12 | 4.0 | 2.2 | Excellent | 84 |
| Ex. 39 | AS (80) | PBT (20) | 93 | 42 | 4.5 | 3.6 | Excellent | 91 |
| Ex. 40 | PBT (80) | St-MMA (20) | 162 | 31 | 9.9 | 4.9 | Excellent | 81 |
| Ex. 41 | PBT (80) | AS (20) | 214 | 79 | 12.4 | 3.3 | Excellent | 80 |
| Ex. 42 | PBT (80) | St-MAA (20) | 125 | 74 | 7.8 | 4.8 | Excellent | 92 |
| Comp. Ex. 2 | PBT (100) | — | 212 | 221 | 10.6 | 12.6 | Failure | 98 |

Polystyrene (GPPS):

SUMIBRIGHT 4, manufactured by Sumitomo Chemical Co., Ltd.
A styrene-acrylonitrile copolymer (AS):
A polyester elastomer:
HITRAYLE 6747, manufactured by Toray-Dupont Co., Ltd.
The right angle type tear strength and the Elmendorf tear strength in the MD direction and the TD direction of the film Examples 43 to 48 and Comparative Example 3

With the use of a Henshell mixer, thermoplastic resins were blended in proportions shown Table 11 and the resultant resin composition was heated and kneaded using a extrusion machine (65 mm in diameter) to prepare pellets. Using the pellets thus obtained, the above-mentioned procedure was repeated, except for Examples 45 and 48, to provide a film (40 μm in thickness) by extrusion molding with use of a T-die. In Examples 45 and 48, the pellets were respectively molded into a film by an inflation molding method at a blow ratio of 3.2 and 4.8.

The following thermoplastic resins were used in these Examples in addition to the thermoplastic resins employed in Examples 1 to 28.

Polystyrene (GPPS):
SUMIBRIGHT 4, manufactured by Sumitomo Chemical Co., Ltd.

A low density polyethylene (LDPE):
REXRON F12S, manufactured by Nippon Petrochemical Co., Ltd.

A high density polyethylene (HDPE):
TUFPREN E707, manufactured by Nippon Petrochemical Co., Ltd.

A styrene-ethylene-propylene-styrene block copolymer (SEPS):
SEPTON 2104, manufactured by Kuraray Co., Ltd.

The right angle type tear strength was determined for a test piece (76 mm×63 mm) of the film without forming notches in the piece and the Elmendorf tear strength was measured for the test piece (76 mm×63 mm) formed with notches. The tensile rupture elongation was measured in accordance with JIS Z 1702-1976 at a pulling rate of 300 mm per minute and the obtained value was divided by the section area of the test piece before the test. The resulting values were expressed of in terms of $kg/mm^2$.

The results are shown in Table 11. As clearly indicated in Table 11, the films of Examples 43 to 48 are excellent in tear properties in the MD direction and the TD direction.

repeated to provide a film (40 μm in thickness) by T-die extrusion molding.

In addition to the thermoplastic resins used in Examples 1 to 28, the following thermoplastic resins were employed in these Examples.

Polypropylene (PP):
UBEPOLYPRO FM101A, manufactured by Ube Industries

A high density polyethylene (HDPE):
HIZEX 3300F, manufactured by Mitsui Petrochemical Co., Ltd.

A linear low density polyethylene (LLDPE):
SUMICASEN FA203-1, manufactured by Sumitomo Chemical Co., Ltd.

Nylon 6 (Ny6):
UBENYLON 1030B, manufactured by Ube Industries

Nylon 66 (Ny66):
UBENYLON 2026B, manufactured by Ube Industries

The right angle type tear strength, the Elmendorf tear strength, the light transmittance and haze (%) for the film were determined.

The results are shown in Tables 12 and 13. It is apparent from Tables 12 and 13 that the films of Examples 49 to 59 have superior tear properties. Further, the films of Examples 49 to 57, especially of Examples 49 to 53 have an enhanced transparency.

TABLE 11

| | Resin Composition | | | Right Angle Type Tearing Strength (kg/cm) | | Elmendorf Tearing Strength (kg/cm) | | Rupture Extension (%) | |
|---|---|---|---|---|---|---|---|---|---|
| | Component 1 (weight %) | Component 2 (weight %) | Component 3 (weight %) | MD | TD | MD | TD | MD | TD |
| Ex. 43 | HIPS (65) | PP (35) | SEPS (10) | 71 | 43 | 6.5 | 3.3 | 73 | 49 |
| Ex. 44 | HIPS (65) | PET (35) | SEBS (10) | 117 | 98 | 9.0 | 3.5 | 151 | 58 |
| Ex. 45 | HIPS (65) | LLDPE (35) | SEBS (10) | 97 | 93 | 2.9 | 3.7 | 96 | 47 |
| Ex. 46 | GPPS (65) | LLDPE (35) | SEBS (10) | 112 | 96 | 5.3 | 2.0 | 144 | 26 |
| Ex. 47 | GPPS (65) | LDPE (35) | SEBS (10) | 103 | 42 | 4.8 | 1.1 | 33 | 32 |
| Ex. 48 | HIPS (23) GPPS (42) | LDPE (35) | SEBS (10) | 74 | 67 | 2.3 | 2.9 | 61 | 32 |
| Comp. Ex. 3 | — | HDPE (100) | — | 446 | 108 | 51 | 2 | 206 | 53 |

Examples 49 to 59 and Comparative Examples 4 to 6

Thermoplastic resins were blended in a proportion shown in Tables 12 and 13 and the procedure mentioned above was

TABLE 12

| | Resin Composition | | Right Angle Type Tear Strength (kg/cm) | | Elmendorf Tear Strength (kg/cm) | | | Transparency | |
|---|---|---|---|---|---|---|---|---|---|
| | Component 1 (weight %) | Component 2 (weight %) | MD | TD | MD | TD | Easy-Tear Properties | Light Transmittance (%) | Haze (%) |
| Ex. 49 | PP (80) | Ny12 (20) | 230 | 35 | 11.3 | 2.6 | Excellent | 91 | 12 |
| Ex. 50 | PP (70) | Ny12 (30) | 210 | 65 | 12.2 | 4.4 | Excellent | 91 | 17 |
| Ex. 51 | PP (85) | PBT (15) | 235 | 40 | 11.8 | 2.3 | Excellent | 91 | 10 |
| Ex. 52 | HDPE (86) | Ny12 (20) | 240 | 37 | 13.0 | 2.2 | Excellent | 91 | 17 |
| Ex. 53 | LLDPE (80) | Ny12 (20) | 200 | 60 | 10.3 | 4.5 | Excellent | 91 | 16 |
| Ex. 54 | Pp (80) | Ny6 (20) | 240 | 40 | 13.0 | 3.1 | Excellent | 87 | 32 |
| Ex. 55 | HDPE (80) | Ny6 (20) | 250 | 45 | 12.4 | 2.8 | Excellent | 87 | 35 |

TABLE 13

| | Resin Composition | | Right Angle Type Tear Strength (kg/cm) | | Elmendorf Tear Strength (kg/cm) | | | Transparency | |
|---|---|---|---|---|---|---|---|---|---|
| | Component 1 (weight %) | Component 2 (weight %) | MD | TD | MD | TD | Easy-Tear Properties | Light Transmittance (%) | Haze (%) |
| Ex. 56 | LLDPE (80) | Ny6 (20) | 190 | 55 | 11.3 | 4.8 | Excellent | 87 | 34 |
| Ex. 57 | PP (80) | Ny66 (20) | 250 | 35 | 13.5 | 2.4 | Excellent | 87 | 32 |
| Ex. 58 | PP (80) | PC (20) | 250 | 45 | 13.0 | 3.3 | Excellent | 83 | 58 |
| Ex. 59 | HDPE (80) | PC (20) | 240 | 48 | 12.8 | 3.5 | Excellent | 83 | 61 |
| Comp. Ex. 4 | PP (100) | — | 230 | 210 | 26.4 | 12.8 | Failure | 92 | 6 |
| Comp. Ex. 5 | HDPE (100) | — | 240 | 200 | 23.3 | 13.5 | Failure | 92 | 8 |
| Comp. Ex. 6 | LLDPE (100) | — | 200 | 180 | 18.4 | 12.3 | Failure | 92 | 5 |

We claim:

1. A tearable film formed from at least one resin combination selected from the group consisting of:
   (a) a resin combination of a first polymer which is at least one styrenic polymer, and a second polymer which is at least one member selected from the group consisting of a polyester and a polyamide; and
   (b) a resin combination of a first polymer which is at least one polyester, and a second polymer which is at least one member selected from the group consisting of a polycarbonate, an acrylic polymer and a polyamide,
   wherein said resin compositions (a)–(b) have an islands-sea structure comprising a continuous phase and a dispersed phase dispersed in said continuous phase.

2. A tearable film according to claim 1, wherein
   said styrenic polymer is at least one member selected from the group consisting of a polystyrene and a rubber-modified impact resistant polystyrene;
   said polyester is at least one member selected from the group consisting of polyethylene terephthalate, poly-butylene terephthalate, and poly-1,4-dimethylol-cyclohexane terephthalate; and
   said polyamide is at least one member selected from the group consisting of nylon 6, nylon 66, nylon 610, nylon 612, nylon 11 and nylon 12.

3. A tearable film according to claim 1, wherein said styrenic polymer is at least one member selected from the group consisting of polystyrene, a styrene-(meth)acrylic acid copolymer, a styrene-(meth)acrylic acid ester copolymer and a styrene-acrylonitrile copolymer.

4. A tearable film according to claim 1, wherein said resin composition comprises 35–98% by weight of the first polymer and 2–65% by weight of the second polymer.

5. A tearable film according to claim 1, wherein
   said resin composition (a) comprises 15 to 98% by weight of a styrenic polymer and 85 to 2% by weight of a polyester, or 50 to 98% by weight of a rubber-modified impact resistant polystyrene and 2 to 50% by weight of a polyester.

6. A tearable film according to claim 1, which further comprises 0.5 to 30 parts by weight of a compatibilizing agent relative to 100 parts by weight of the total weight of said first and second polymers.

7. A tearable film according to claim 1, wherein said resin composition (b) further comprises a compatibilizing agent.

8. A tearable film according to claim 1, wherein said compatibilizing agent is a hydrogenated or modified copolymer of styrenic monomer and conjugated diene.

9. A tearable film according to claim 1, which has, in at least one direction, a tearing maximum torque of 60 g cm/$\mu$m or less, or a tearing maximum normal force of 10 g/$\mu$m or less.

10. A tearable film according to claim 1, wherein said tearable film has a ratio Etd/Emd of a rupture elongation Etd in the orthogonal direction to the film drawing direction relative to a rupture elongation Emd in the film drawing direction of 50% or less.

11. A tearable film according to claim 1, which is tearable in both direction of the film drawing direction and the orthogonal direction relative to the film drawing direction.

12. A tearable film according to claim 1, wherein said tearable film has, in the film drawing direction and the orthogonal direction relative to the film drawing direction, a right angle type tear strength of 5 to 120 kg/cm and an Elmendorf tear strength of 1 to 10 kg/cm.

13. A method of producing a tearable film which comprises extruding and molding the resin composition (a) or (b) as claimed in claim 1 from a T-die into a film without stretching.

14. A method of producing a tearable film which comprises inflation molding the resin composition (a) or (b) as claimed in claim 1 into a film at a ratio V/D of a draw ratio V relative to a blow ratio D being equal to 0.5 to 8.

* * * * *

UNITED STATES PATENT AND TRADEMARK OFFICE
CERTIFICATE OF CORRECTION

PATENT NO.    : 6,054,209
DATED         : April 25, 2000
INVENTOR(S)   : Imanishi et al.

It is certified that error appears in the above-identified patent and that said Letters Patent is hereby corrected as shown below:

Column 35,
Line 7, "claim 1" should read -- claim 7 --.

Column 36,
Line 4, "claim 1" should read -- claim 11 --.

Signed and Sealed this

Third Day of July, 2001

*Attest:*

*Nicholas P. Godici*

NICHOLAS P. GODICI
*Attesting Officer*       *Acting Director of the United States Patent and Trademark Office*